United States Patent [19]

Murashima et al.

[11] Patent Number: 5,025,239
[45] Date of Patent: Jun. 18, 1991

[54] ELECTROMAGNETIC ACTUATOR FOR CAMERAS AND THE LIKE

[75] Inventors: Nobuharu Murashima; Hideo Kajita; Yasuo Hawai; Toshihiko Ishimura; Akira Okuno; Junichi Tanii; Reiji Seki, all of Osaka, Japan

[73] Assignee: Minolta Camera Kabushiki Kaisha, Osaka, Japan

[21] Appl. No.: 330,450

[22] Filed: Mar. 30, 1989

[30] Foreign Application Priority Data

| Apr. 1, 1988 | [JP] | Japan | 63-78093 |
| Apr. 1, 1988 | [JP] | Japan | 63-78094 |
| Apr. 11, 1988 | [JP] | Japan | 63-87386 |
| May 11, 1988 | [JP] | Japan | 63-115401 |
| May 11, 1988 | [JP] | Japan | 63-115402 |
| May 11, 1988 | [JP] | Japan | 63-115403 |

[51] Int. Cl.⁵ .................. H01F 7/08; H01F 3/00; G03B 7/08
[52] U.S. Cl. .................... 335/265; 335/281; 354/440
[58] Field of Search ............. 335/265, 267, 281, 282; 337/276; 354/440

[56] References Cited

U.S. PATENT DOCUMENTS

| 2,735,968 | 2/1956 | Bogue et al. | 335/267 |
| 3,343,112 | 9/1967 | Schulze | 335/276 |
| 3,453,572 | 7/1969 | Masterson | 335/276 |
| 3,477,049 | 11/1969 | Kreidler | 335/276 |
| 4,132,474 | 1/1979 | Ueda et al. | |
| 4,133,608 | 1/1979 | Tanaka | |
| 4,160,983 | 7/1979 | Inagaki et al. | |
| 4,682,133 | 7/1987 | Kern | 335/265 |
| 4,833,435 | 5/1989 | Ohara | 335/265 |

FOREIGN PATENT DOCUMENTS

| 58-170 | 1/1983 | Japan |
| 58-40576 | 9/1983 | Japan |
| 59-47442 | 11/1984 | Japan |
| 60-20115 | 2/1985 | Japan |
| 60-18804 | 6/1985 | Japan |

Primary Examiner—Steven L. Stephan
Assistant Examiner—Nilay H. Vyas
Attorney, Agent, or Firm—Burns, Doane, Swecker & Mathis

[57] ABSTRACT

An electromagnetic actuator suitable for use in combination with the mechanisms of cameras and the like. The electromagnetic actuator has a single electromagnet, and first and second armatures disposed opposite to the opposite attracting surfaces of the electromagnet, respectively. The first armature actuates a first operating lever for operating the shutter release mechanism of a camera, and the second armature actuates a second operating lever for operating the diaphragm of the camera. The first armature is separated from the attracting surface and the second armature is in contact with the attracting surface while the electromagnet is not energized. When the electromagnet is energized, the first armature is attracted to the attracting surface to actuate the first operating lever for releasing the shutter. When the electromagnet is de-energized, the second armature is separated from the attracting surface to allow the second operating lever which has been detained by the second armature to be turned for controlling the diaphragm. A control circuit decreases the current energizing the electromagnet after the first and second armatures have been attracted to the corresponding attracting surfaces to save power.

5 Claims, 29 Drawing Sheets

FIG. 1

| FIG.1(b) | FIG.1(a) |

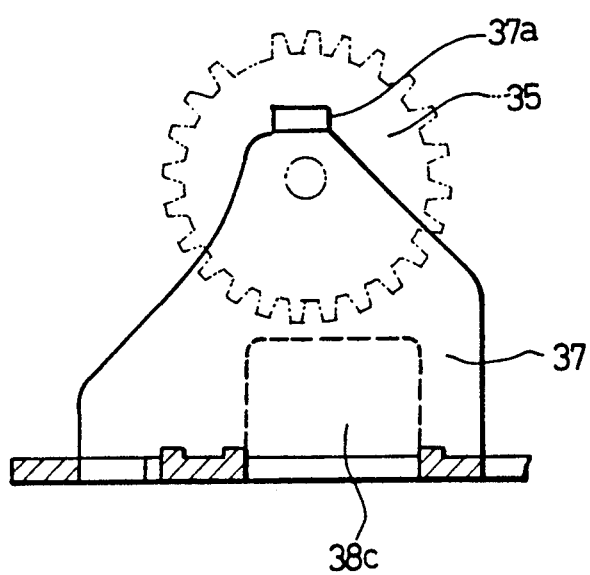
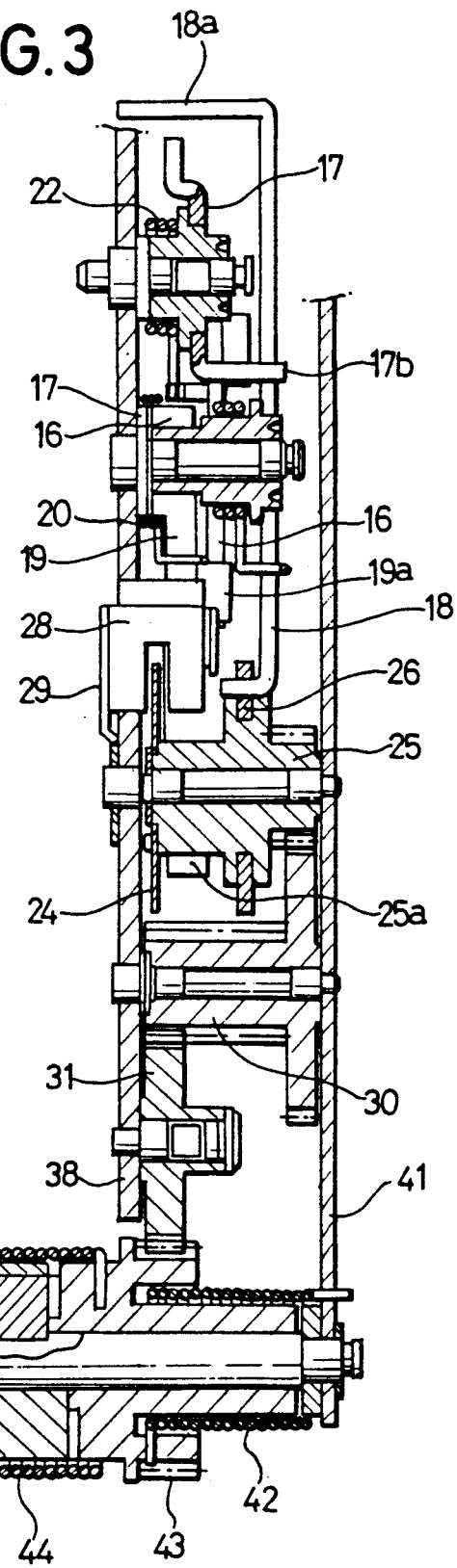

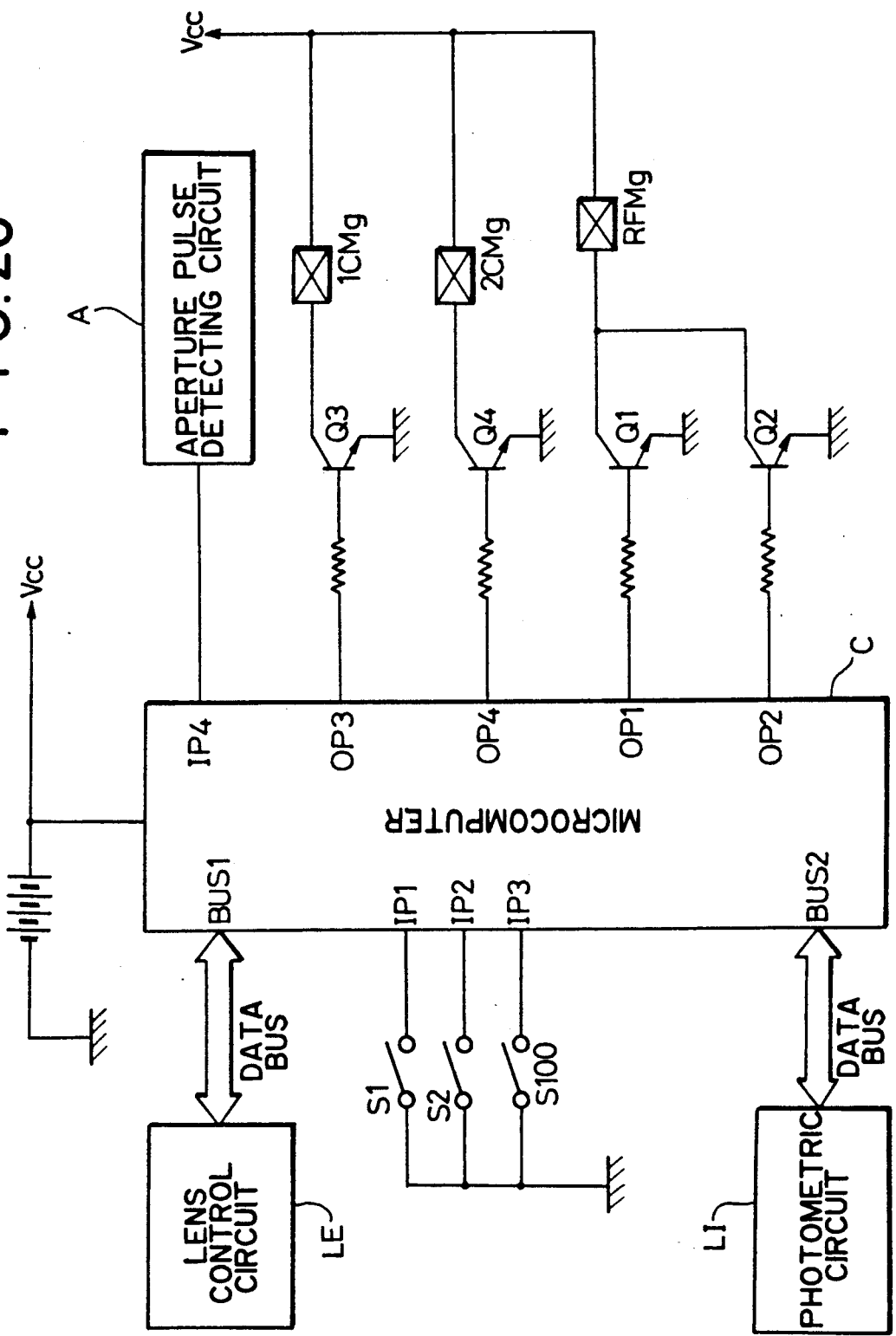

ELECTROMAGNETIC ACTUATOR FOR CAMERAS AND THE LIKE

BACKGROUND OF THE INVENTION

1. Field of the Invention

The present invention relates to an electromagnetic actuator and, more particularly, to an electromagnetic actuator for actuating the shutter-diaphragm control system of a camera.

2. Description of the Prior Art

A shutter-diaphragm control system for a camera employs a motor for operating a shutter release mechanism to release the shutter, and a spring for resetting the shutter release mechanism for the next action. Another shutter-diaphragm control system for a camera employs a spring for operating a shutter release mechanism to release the shutter, and a motor for resetting the shutter release mechanism for the next action. The latter shutter-diaphragm control system is provided with an electromagnetic actuator for operating the shutter release mechanism.

Many small precision apparatus, such as cameras, employ electromagnetic actuators for actuating many operating members, and hence those small precision apparatus need as many electromagnetic actuators as the operating members, which has been an obstacle to reduction in size and weight of such precision apparatus and has been a cause of increase in power consumption of such precision apparatus.

SUMMARY OF THE INVENTION

Accordingly, it is a principal object of the present invention to provide an electromagnetic actuator suitable for cameras and the like and having a comparatively low power consumption.

It is another object of the present invention to provide an electromagnetic actuator having a single electromagnet and capable of actuating two individual operating members.

It is a further object of the present invention to provide an electromagnetic actuator having a single electromagnet, a first armature associated with the electromagnet so as to actuate the shutter release mechanism of a camera when attracted to the electromagnet, and a second armature associated with the electromagnet so as to control the diaphragm of the camera when released from the electromagnet.

The above and other objects, features and advantages of the present invention will become more apparent from the following description taken in conjunction with the accompanying drawings.

BRIEF DESCRIPTION OF THE DRAWINGS

FIG. 3 is a sectional side elevation of the left side of an essential portion of the shutter-diaphragm control system of FIG. 1;

FIG. 5 is a sectional view of the bottom portion of an essential portion of the shutter-diaphragm control system of FIG. 1;

FIG. 20 is a circuit diagram of an exposure control circuit;

DETAILED DESCRIPTION OF PREFERRED EMBODIMENTS

Figure 1A:
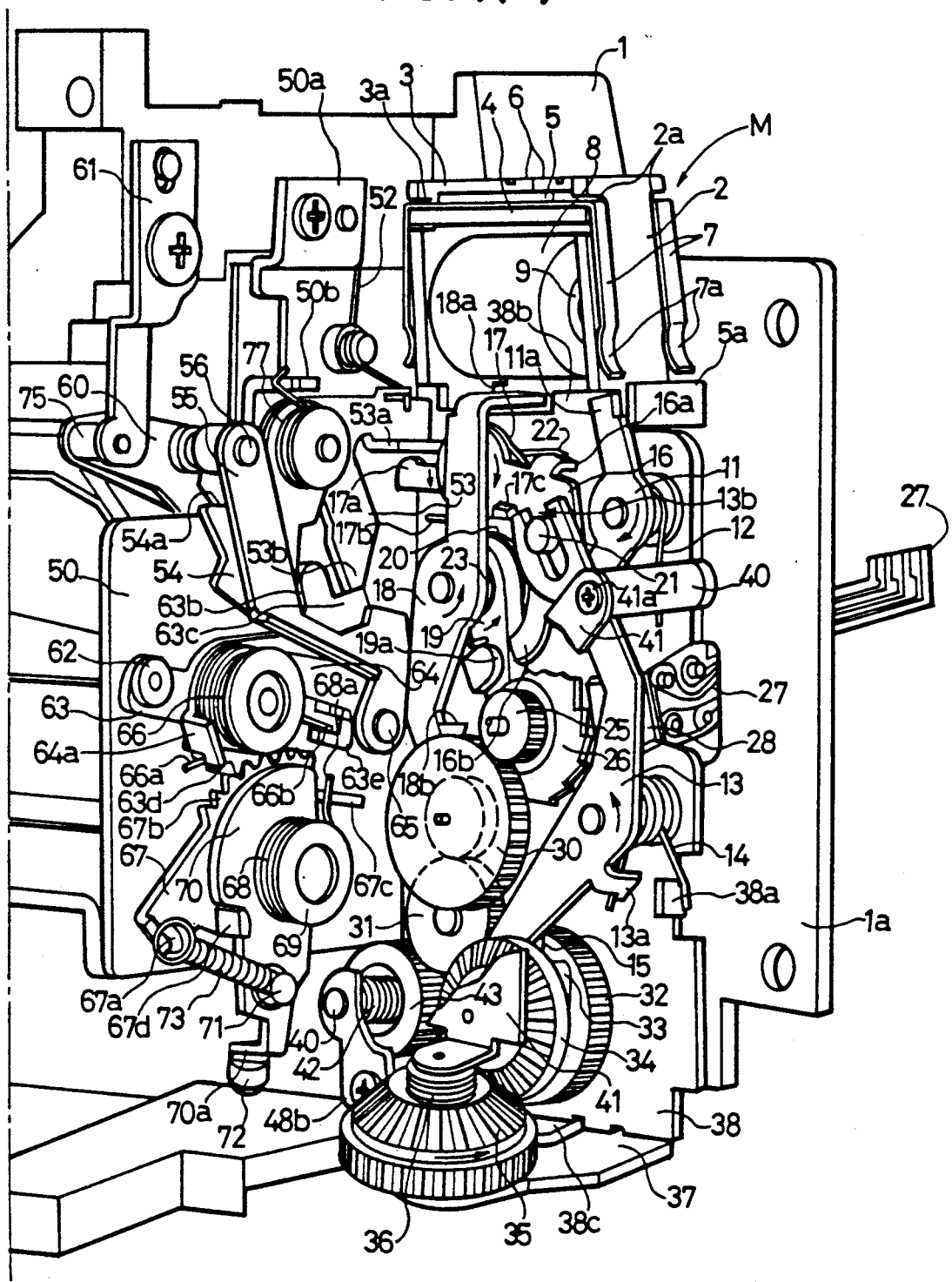
FIGS. 1(a) and 1(b) are, when combined as shown in FIG. 1, perspective views of a shutter-diaphragm control system for a camera incorporating an electromagnetic actuator in a first embodiment according to the present invention.

A shutter-diaphragm control system incorporating an electromagnetic actuator in a first embodiment according to the present invention will be described hereinafter.

Shutter Release Mechanism and Diaphragm Control Mechanism

Referring to FIGS. 1 to 5, a mirror box, a mirror driving mechanism, a diaphragm driving mechanism, a diaphragm control mechanism and a release operating mechanism are mounted on a front frame 1 to form a front frame unit.

An electromagnetic actuator M comprises armatures 2 and 3, a yoke 4, a magnet holder 5, screws 6, U-shaped pressure springs 7, a coil 8 and a core 9. The electromagnet is constructed by winding the coil 8 directly on the core 9. Recesses are formed in the respective central portions of the opposite ends of the yoke 4 so that projecting portions are formed on the opposite sides of each end of the yoke 4. Recesses 2a and 3a having a shape corresponding to that of the projecting portions of the yoke 4 are formed in the opposite sides of the armatures 2 and 3, respectively. The projecting portions of the yoke 4 are received in the recesses 2a and 3a of the armatures 2 and 3 so that the armatures 2 and 3 are suspended swingably on the opposite ends of the yoke 4, respectively. The armatures 2 and 3 are biased resiliently toward the opposite ends of the core 9 and retained in place on the yoke 4 by the pressure springs 7 received in the recesses 2a and 3a of the armatures 2 and 3, respectively. The pressure springs 7 are positioned by bosses, not shown, formed by punching in the yoke 4. The yoke 4 and the pressure springs 7 are fastened to the magnet holder 5 with the screws 6.

The core 9, the armatures 2 and 3 and the yoke 4 form a closed magnetic path for magnetic flux induced by the coil 8. The magnet holder 5 is screwed to a first diaphragm base plate 38 to fix the electromagnetic actuator M to the first diaphragm base plate 38.

Figure 1B:
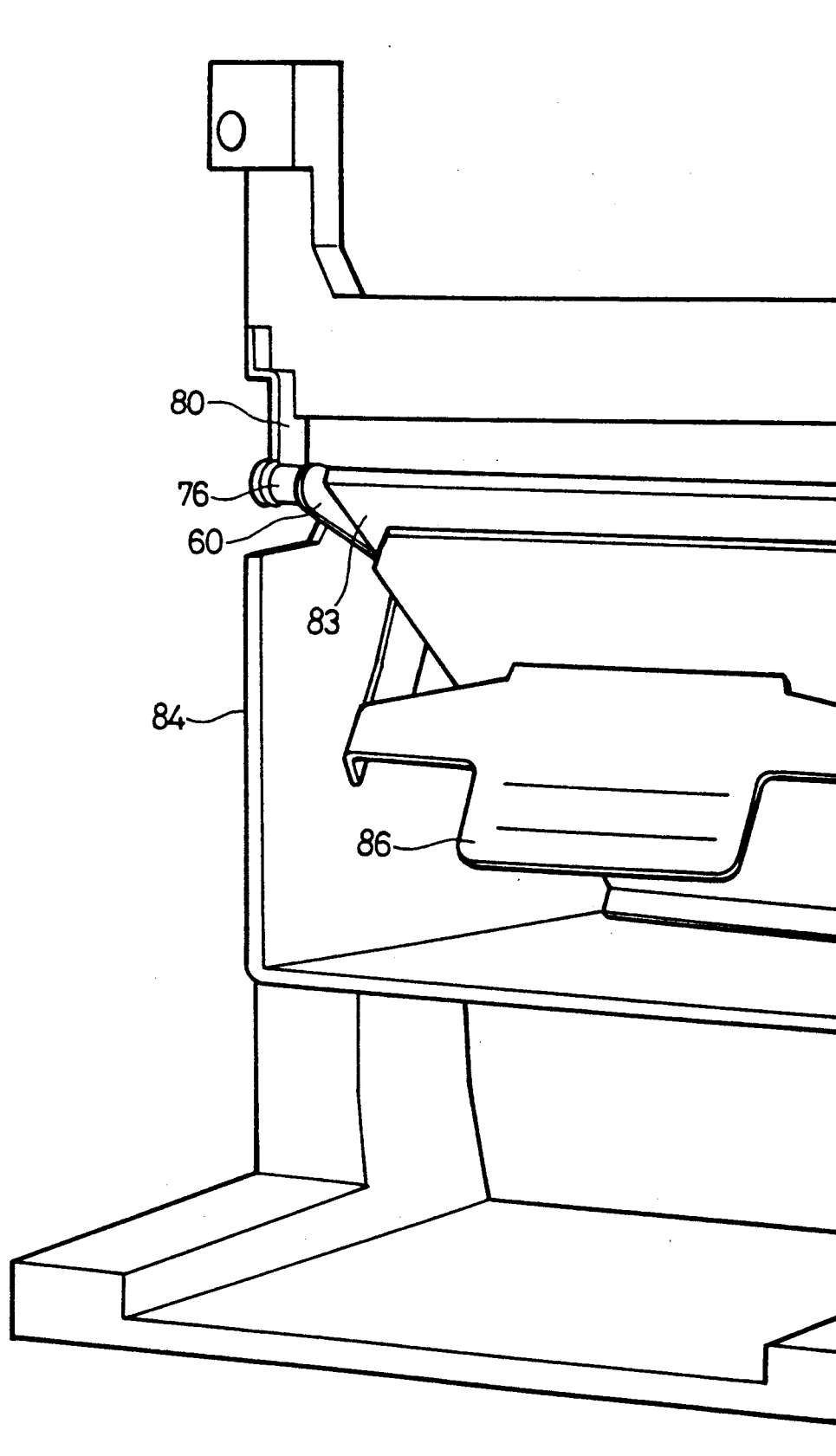
Figure 2:
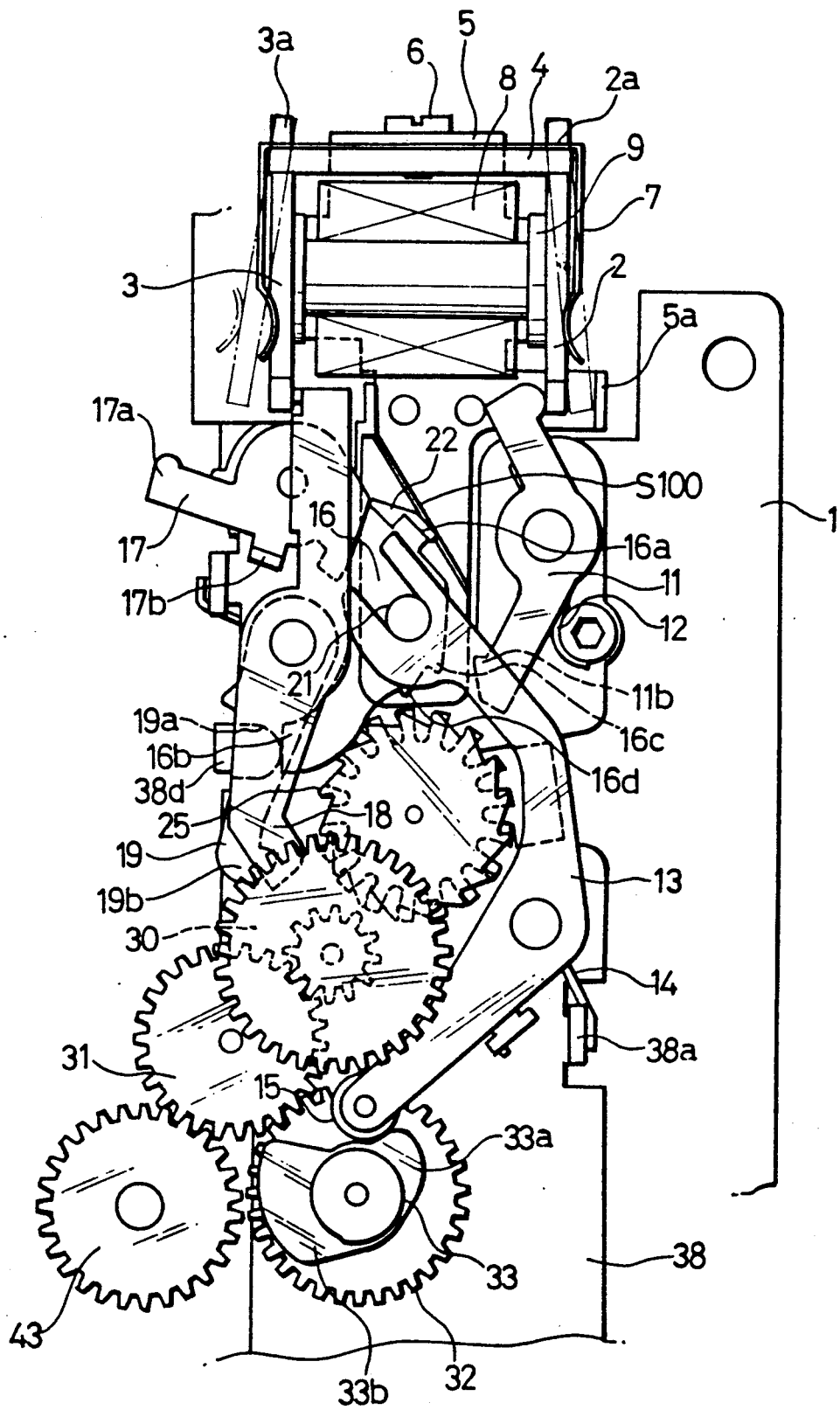
FIG. 2 is a front elevation of the shutter-diaphragm control system of FIG. 1.

One end, i.e., the upper end as viewed in FIG. 1, 11a of a release stop lever 11 engages the inner surface of the lower end of the armature 2. A hook 11b is formed in the lower end of the release stop lever 11. A lug 5a is formed in the magnet holder 5 so as to be positioned opposite the upper end 11a of the release stop lever 11 with respect to the lower end of the armature 2.

A release retaining lever spring 12 has one end engaging a pin 40 provided between the first diaphragm base plate 38 and a third diaphragm base plate 41, and the other end engaging the release stop lever 11 to urge the release stop lever 11 in a clockwise direction as indicated by an arrow in FIG. 1.

A release trigger lever 16 and a mirror release lever 17 are supported pivotally for individual swing motion about the same axis.

A release overcharge spring 22 has one end engaging a projection 16a formed in the release trigger lever 16, and the other end engaging a projection formed in the mirror release lever 17 near one end 17a to urge the release trigger lever 16 and the mirror release lever 17 so that a projection 17c formed in the mirror release lever 17 is held in contact with the release trigger lever 16. A release trigger pin 21 is fixed to the release trigger lever 16 by staking. The release trigger pin 21 is received in a recess 13b formed in one end of a release charge lever 13 to interlock tee release charge lever 13 and the release trigger lever 16.

A release charge lever spring 14 has one end engaging a projection 38a formed in the first diaphragm base plate 38 and the other end engaging a projection 13a formed in the release charge lever 13. The release charge lever spring 14 urges the lever 13 counterclockwise as viewed in FIG. 1 and urges the release trigger lever 16 clockwise as viewed in FIG. 1. Two successive teeth 16c and 16d (FIG. 2) are formed in the release trigger lever 16 to stop the respective turning motions of the lever 13 and the release trigger lever 16. The tips of the teeth 16c and 16d are on a circle having its center at the center of rotation of the release trigger lever 16.

An aperture stop lever 19 is urged counterclockwise as viewed in FIG. 1 by a spring 20. A hook 19b (FIG. 6) is formed at the free end of the aperture stop lever 19. When the release trigger lever 16 turns clockwise, the free end 16b of the release trigger lever 16 engages a projection 19a formed in the aperture stop lever 19 to turn the aperture stop lever 19 clockwise against the resilience of the spring 20.

A diaphragm stop lever 18 has a hook 18b in one end and a finger 18a in the other end. The finger 18a is formed by bending the other end of the diaphragm stop lever 18 so as to come into contact with the armature 3. The diaphragm stop lever 18 is urged counterclockwise by a main spring 23. A projection 17b formed in the mirror release lever 17 is in contact with the diaphragm stop lever 18 to restrain the diaphragm stop lever 18 from counterclockwise turning. When the release trigger lever 16 and the mirror release lever 17 turn together in a clockwise direction, the projection 17b moves away from the diaphragm stop lever 18 to allow the main spring 23 to turn the diaphragm stop lever 18 counterclockwise. The clockwise turning of the diaphragm stop lever 18 is limited by the projection 38b of the first diaphragm base plate 38.

Figure 4:
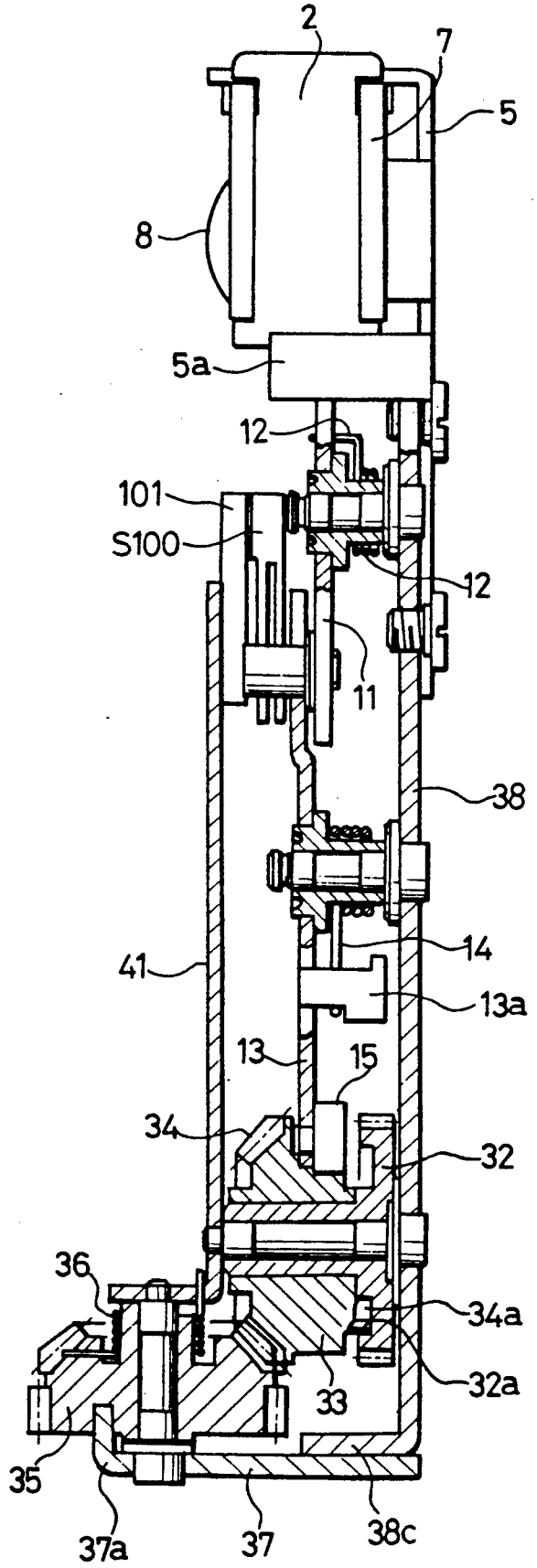
FIG. 4 is a sectional side elevation of the right side of an essential portion of the shutter-diaphragm control system of FIG. 1.

A first bevel gear 35 is urged counterclockwise as viewed in FIG. 1 by a diaphragm return spring 36. A second diaphragm base plate 37 is joined to the lower end of the first diaphragm base plate 38 so as to extend at right angles to the first diaphragm base plate 38. A tongue 38c is formed by bending a portion of the lower end of the first diaphragm base plate 38 at right angles so as to be seated on the second diaphragm base plate 37 (FIGS. 1 and 5). The first bevel gear 35 is supported rotatably on a shaft fixed at the lower end thereof to the second diaphragm base plate 37 and held at the upper end thereof by a third diaphragm base plate 41. The counterclockwise rotation (FIG. 1) of the first bevel gear 35 is limited by a projection 37a formed in the second diaphragm base plate 37 (FIGS. 4 and 5). A partly blank spur gear is formed integrally and coaxially with the first bevel gear 35. The partly blank spur gear engages a partly blank gear, not shown, which turns substantially one full turn to reset the mechanisms and to wind the film. On the other hand, the first bevel gear 35 engages a second bevel gear 34. When the first bevel gear 35 turns clockwise, the second bevel gear 34 is turned counterclockwise. A release charge cam 33 is formed integrally with the second bevel gear 34. A cam follower 15 rotatably supported at the lower end of the release charge lever 13 is in contact with the release charge cam 33. When the release charge cam 33 is turned counterclockwise, the release charge lever 13 is turned clockwise, and thereby the release trigger lever 16 is turned counterclockwise. As shown in FIG. 4, the second bevel gear 34 is provided with a projection 34a. When the second bevel gear 34 is turned counterclockwise through a predetermined angle, the projection 34a engages a recess 32a formed in a diaphragm clutch gear 32 to transmit the rotation of the second bevel gear 34 to the diaphragm clutch gear 32. The rotation of the diaphragm clutch gear 32 is transmitted through a first speed increasing gear 31 to the diaphragm operating mechanism and the diaphragm control mechanism. That is, the first speed increasing gear 31 engages a transmission gear 43 and a second speed increasing gear 30. When the first speed increasing gear 31 turns clockwise, the transmission gear 43 and the second speed increasing gear 30 turn counterclockwise as viewed in FIG. 2. As best shown in FIG. 3, the transmission gear 43 is interlocked with a preset ring pinion 45 so the clockwise rotation of the transmission gear 43 is transmitted directly to the preset ring pinion 45 and the counterclockwise rotation of the same is transmitted indirectly through a diaphragm overcharge spring 44. The preset ring pinion 45 engages a second preset ring, not shown. When the preset ring pinion 45 turns counterclockwise, the second preset ring is turned clockwise to increase the opening of the diaphragm. A roller 46 is mounted coaxially on the preset ring pinion 45 and is held in place by a flange 47. A plurality of rollers, not shown, supported on the front frame 1 are in rolling contact with the roller 46 to secure the smooth rotation of a preset ring. The preset ring is urged in a direction to reduce the opening of the diaphragm by a diaphragm driving spring 42.

The rotation of the second speed increasing gear 30 is transmitted to a diaphragm gear 25 integrally and coaxially provided with a ratchet wheel 26, an open aperture stop cam 25a and an aperture code plate 24 having teeth therearound. When the open aperture stop cam 25a engages the hook 19b of the aperture stop lever 19, the motions of the foregoing members for driving the diaphragm are stopped. However, the diaphragm clutch gear 32 and the second bevel gear 34 are free to rotate in a clockwise direction. Therefore, when the partly blank gear and the first bevel gear 35 are disengaged, the first bevel gear 35 and the second bevel gear 34 are rotated by the diaphragm return spring 36 even while the aperture stop cam 25a is in engagement with the aperture stop lever 19. The motions of the levers of the release mechanism are stopped upon the engagement of the projection 19a of the aperture stop lever 19 with the projection 38d of the first diaphragm base plate 38.

A photoelectric detector 28 having a light emitter and a light receiver is held by a holding plate 29 fixed to the first diaphragm base plate 38 so as to be associated with the aperture code plate 24 to detect an aperture pulse generated by chopping a light from the emitter to the receiver by rotation of the plate 24. The holding plate is fixed together with the shaft of the diaphragm gear 25 to the first diaphragm base plate 38.

The photoelectric detector 28 is connected to a flexible printed wiring board (FPWB) 27, which in turn is connected to another FPWB , not shown, provided on a camera body, not shown.

Mirror Driving Mechanism and Mirror Box

Figure 19:
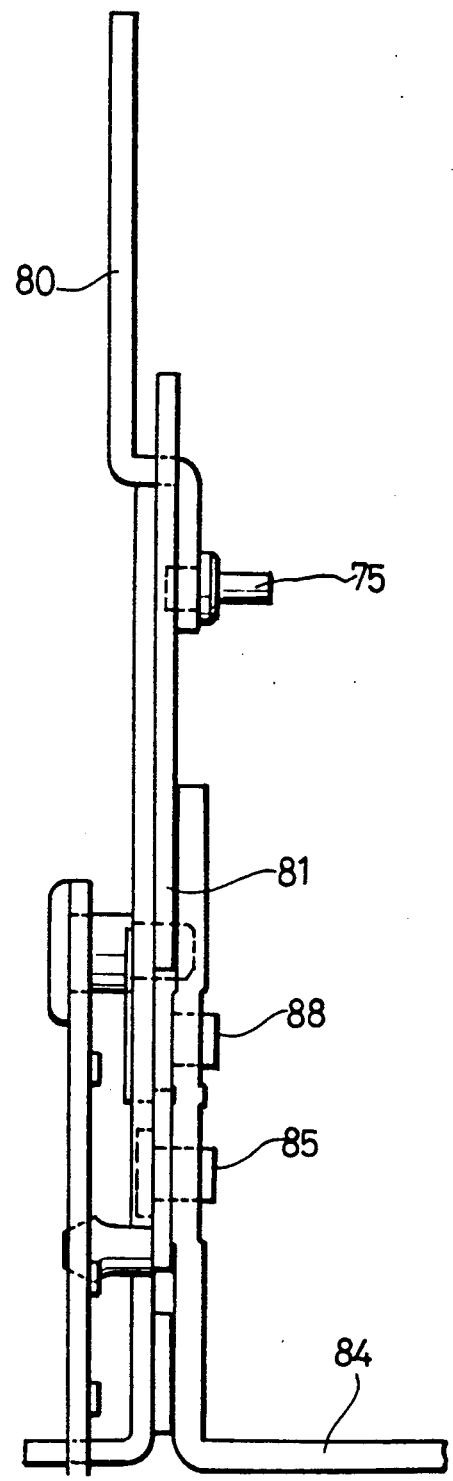
FIG. 19 is a side elevation showing an essential portion of the submirror driving mechanism of FIG. 18.
Figure 16:
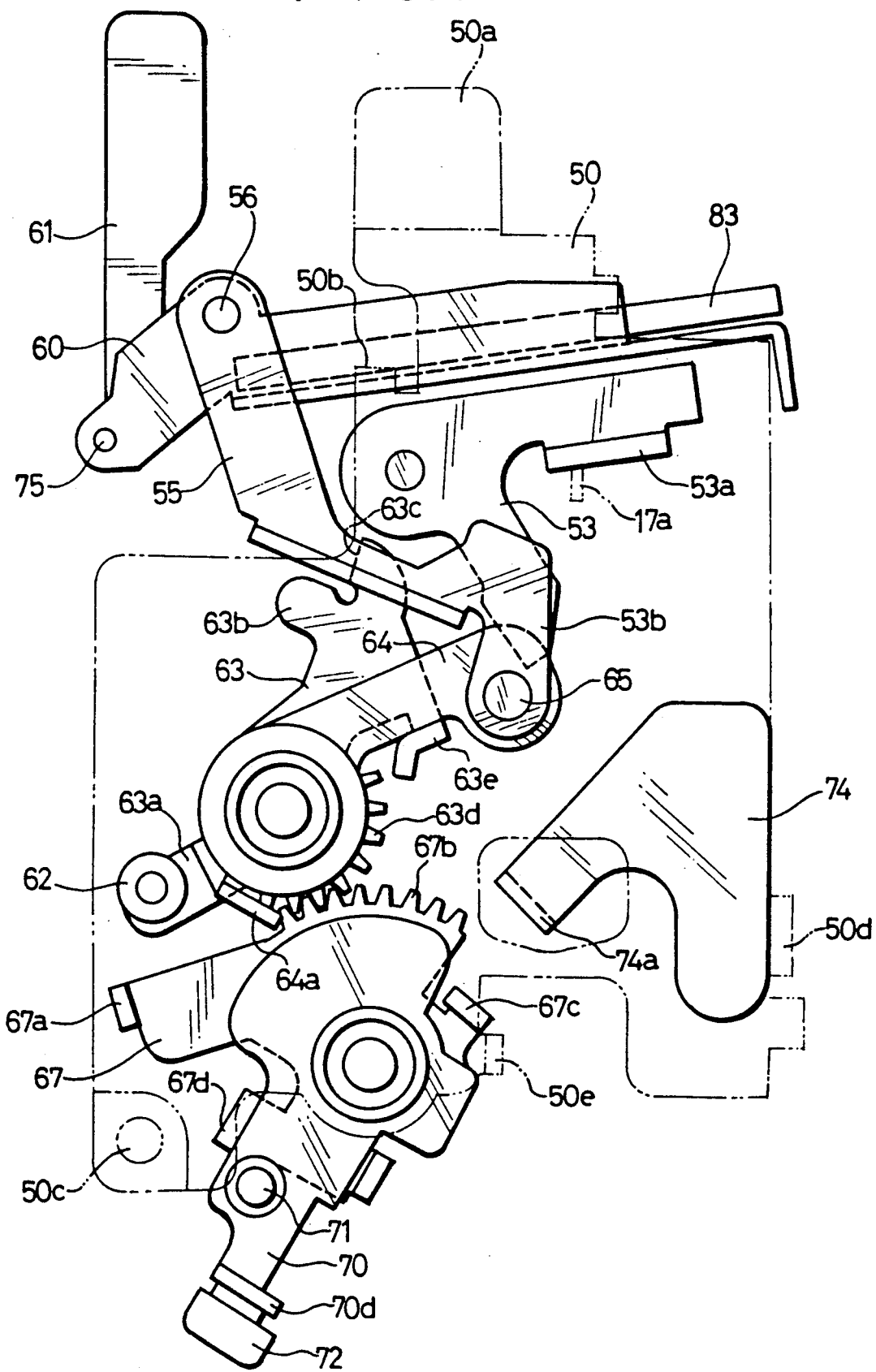
FIG. 16 is a side elevation of a mirror lifting mechanism, in which a mirror is lifted up to its upper position.
Figure 17:
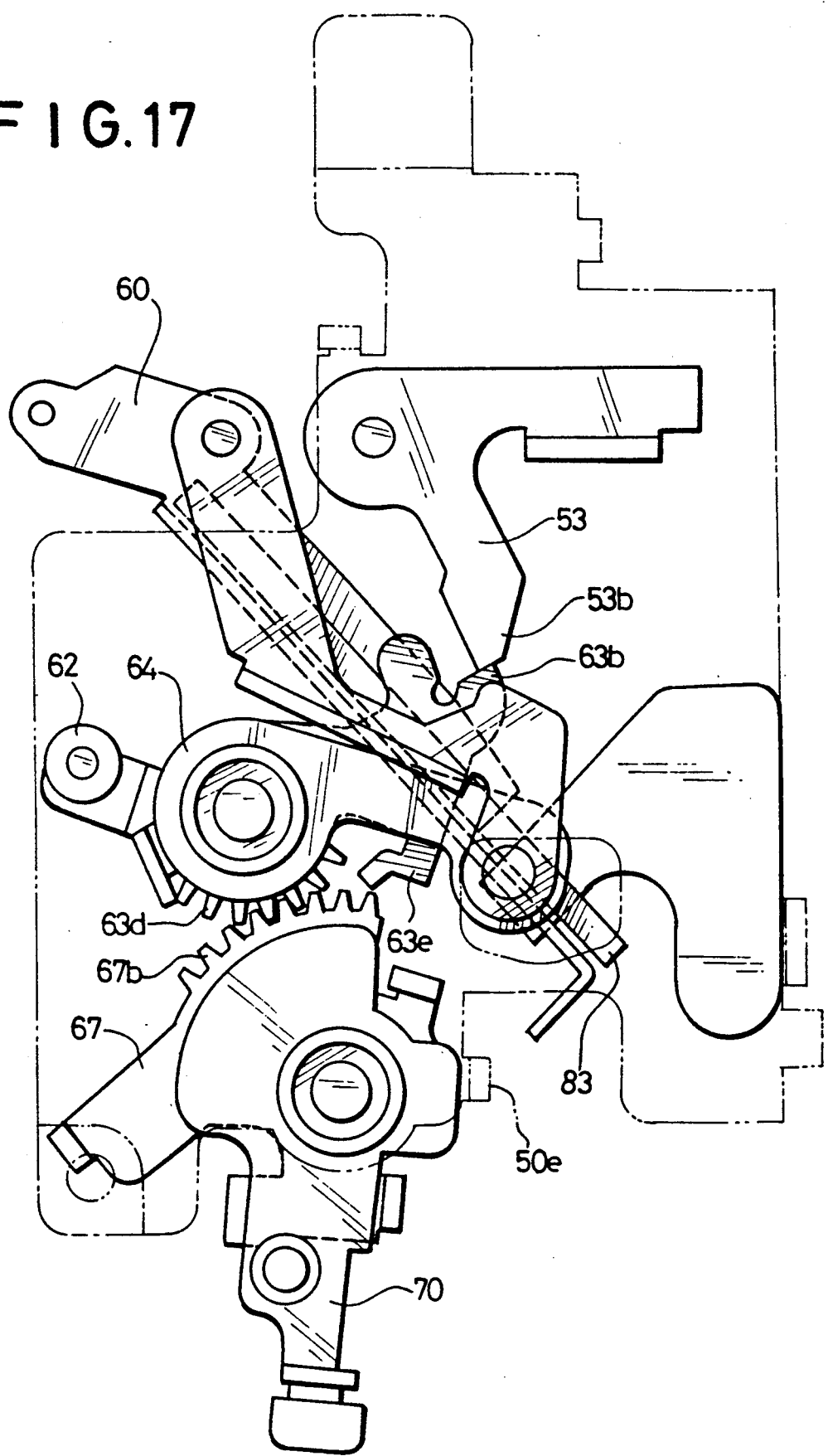
FIG. 17 is a side elevation of the mirror lifting mechanism, in which the mirror has been returned to its lower position.
Figure 18:
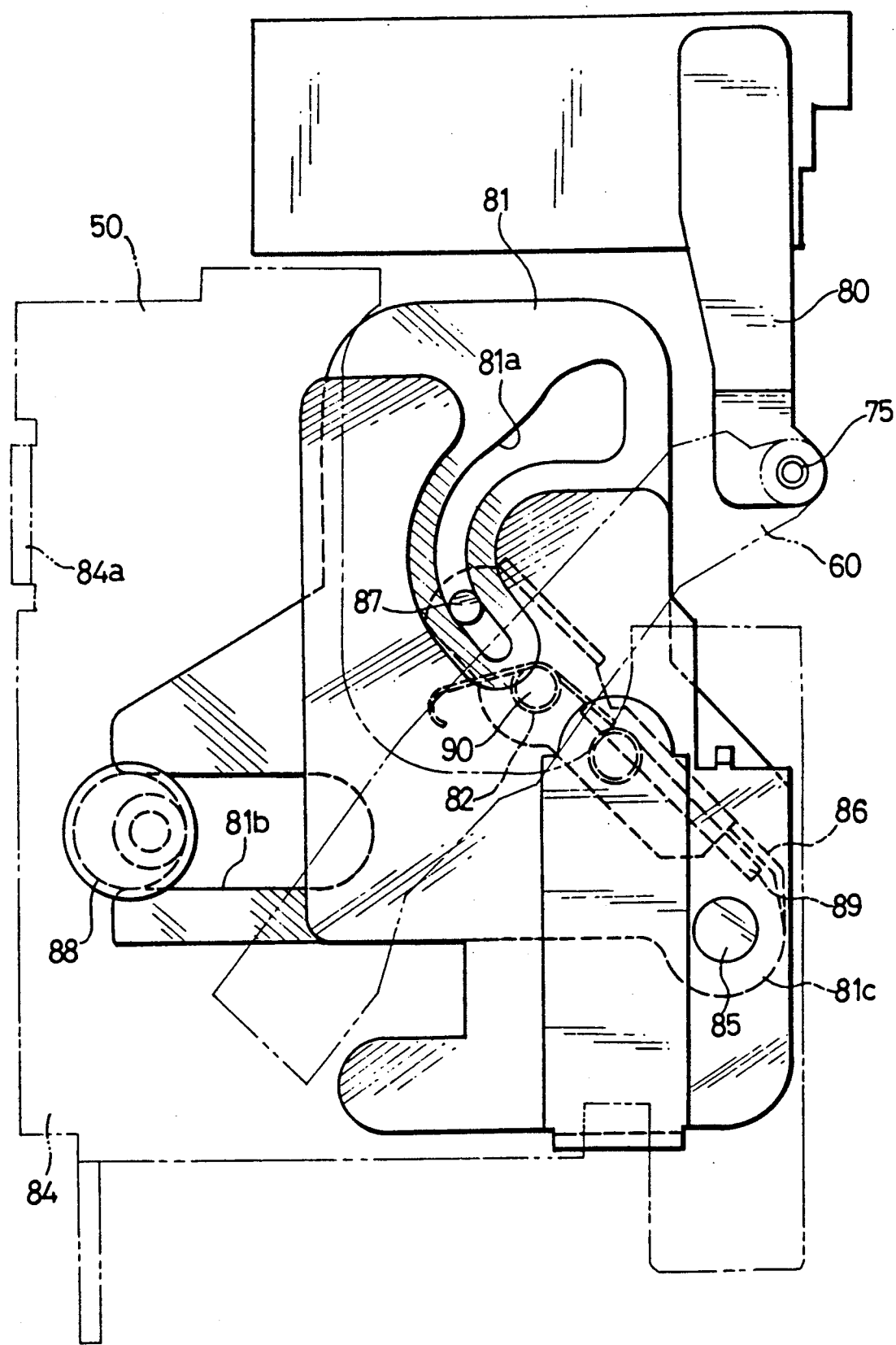
FIG. 18 is a side elevation of a submirror driving mechanism.

FIGS. 16 and 17 show a mirror driving mechanism. In FIG. 16, a mirror is lifted up to its upper position and, in FIG. 17, the mirror is returned to its lower position. FIGS. 18 and 19 show a submirror adjusting mechanism for a mirror box winding system.

As shown in FIG. 1, a mirror box includes mirror base plates 50 and 84, and is mounted on the front frame 1. As shown in FIGS. 16 and 17, the mirror base plate 50 is screwed to the mirror base plate 84 at a part 50c. The mirror base places 50 and 84 are fastened to the front frame 1 at parts 50a (FIG. 1), 50d (FIGS. 16 and 17) and 84a (FIG. 18). A mirror driving mechanism is mounted on the mirror base plate 50. The release mechanism and the diaphragm control mechanism are mounted on the extension 1a (FIG. 1) of the front frame 1 extending in a direction perpendicular to the mirror base plate 50.

Charge levers 67 and 70 are supported rotatably on a charge lever shaft 69 fixed to the mirror base plate 50. A charge roller 72 is supported rotatably on the lower end of the charge lever 70. An overcharge spring 73 has one end engaging a projection 67a formed in the charge lever 67 and the other end engaging a pin 71 attached to the charge lever 70. The overcharge spring 73 urges the charge lever 67 counterclockwise relative to the charge lever 70 and urges the charge lever 70 clockwise relative to the charge lever 67 as viewed in FIG. 16. The counterclockwise turning of the charge lever 70 relative to the charge lever 67 is limited by a projection 67d formed in the charge lever 67. A driving spring 68 is mounted on a charge lever bearing 69. One end of the driving spring 68 is put on a projection 67c formed in the charge lever 67 and the other end of the same is put on a projection 50e formed in the mirror base plate 50 (FIGS. 16 and 17) to bias both the charge levers 67 and 70 in a clockwise direction. A gear 67b formed in the charge lever 67 engages a gear 63d formed in a shutter charge lever 63. The shutter charge lever 63 is combined with a driving lever 64 by a biasing force of a mirror return spring 66 and a contact of a projection 63e formed in the shutter charge lever 63 and the driving lever 64. A shutter charge pin 62 is fixed to one end 63a of the shutter charge lever 63. The shutter charge pin 62 moves upward as the shutter charge lever 63 turns clockwise to turn a shutter setting lever attached to a shutter unit, not shown. A projection 63b is formed at the other end of the shutter charge lever 63 to stop the turning motions of the levers caused by the driving spring 68 by a finger 53b formed in a mirror stop lever 53. The mirror stop lever 53 is urged clockwise by a spring 52.

A link plate 55 has one end joined pivotally to the driving lever 64 with a connecting pin 65 and the other end joined pivotally to a main mirror holder 60 with a connecting pin 56 to form a quadric link. When the driving lever 64 turns counterclockwise, the link plate 55 moves upward along a substantially straight line. The main mirror holder 60 is supported swingably on a pair of base plates 61 and 80 by a pair of main mirror pins 75 and 76. The base plates 61 and 80 are fixed to the mirror box.

A main mirror 83 is attached adhesively to the main mirror holder 60. The upward motion of the link plate 55 causes the main mirror holder 60 to turn counterclockwise. A bound arresting lever 54 is urged counterclockwise by a spring 77 so as to be in contact with a projection 63b formed in the shutter charge lever 63. When the shutter charge lever 63 turns counterclockwise, the bound arresting lever 54 turns clockwise, so that the upper end 54a of the bound arresting lever 54 comes into contact with the connecting pin 56 from below the same with the main mirror holder 60 at its upper position to arrest the rebound of the main mirror 83.

When the main mirror holder 60 rests on a bent portion 74a formed in a mirror stopper 74 (FIG. 17), the main mirror 83 is tilted at an angle of 45° relative to the optical axis of an incident light into the mirror box.

A submirror 89 is attached adhesively to a submirror holder 86. The submirror holder 86 is supported pivotally on the main mirror holder 60 as shown in FIG. 18. A pin 87 fixed to one end of the submirror holder 86 slides along a cam groove 81a formed in a submirror adjusting plate 81. A spring 82 mounted on a connecting pin 90 provided on the submirror holder 86 urges the submirror 89 clockwise as viewed in FIG. 18 relative to the main mirror holder 60. Accordingly, the pin 87 slides along the cam groove 81a and the submirror 89 turns clockwise until the same lies on the backside of the main mirror holder 60 as the main mirror 83 turns clockwise toward the upper position. The submirror adjusting plate 81 is supported rotatably on a pin 85 fixed to the mirror base plate 50. An eccentric pin 88 for submirror adjustment is mounted on a mirror base plate 84 so as to extend through a recess 81b formed in the submirror adjusting plate 81. The submirror adjusting plate 81 provided with the cam groove 81a is moved by turning the eccentric pin 88 to determine the initial position of the submirror holder 86.

The operation of the shutter release mechanism, the diaphragm control mechanism and the mirror release control mechanism thus constructed will be described hereinafter.

Operation of the Shutter Release Mechanism

Figure 6:
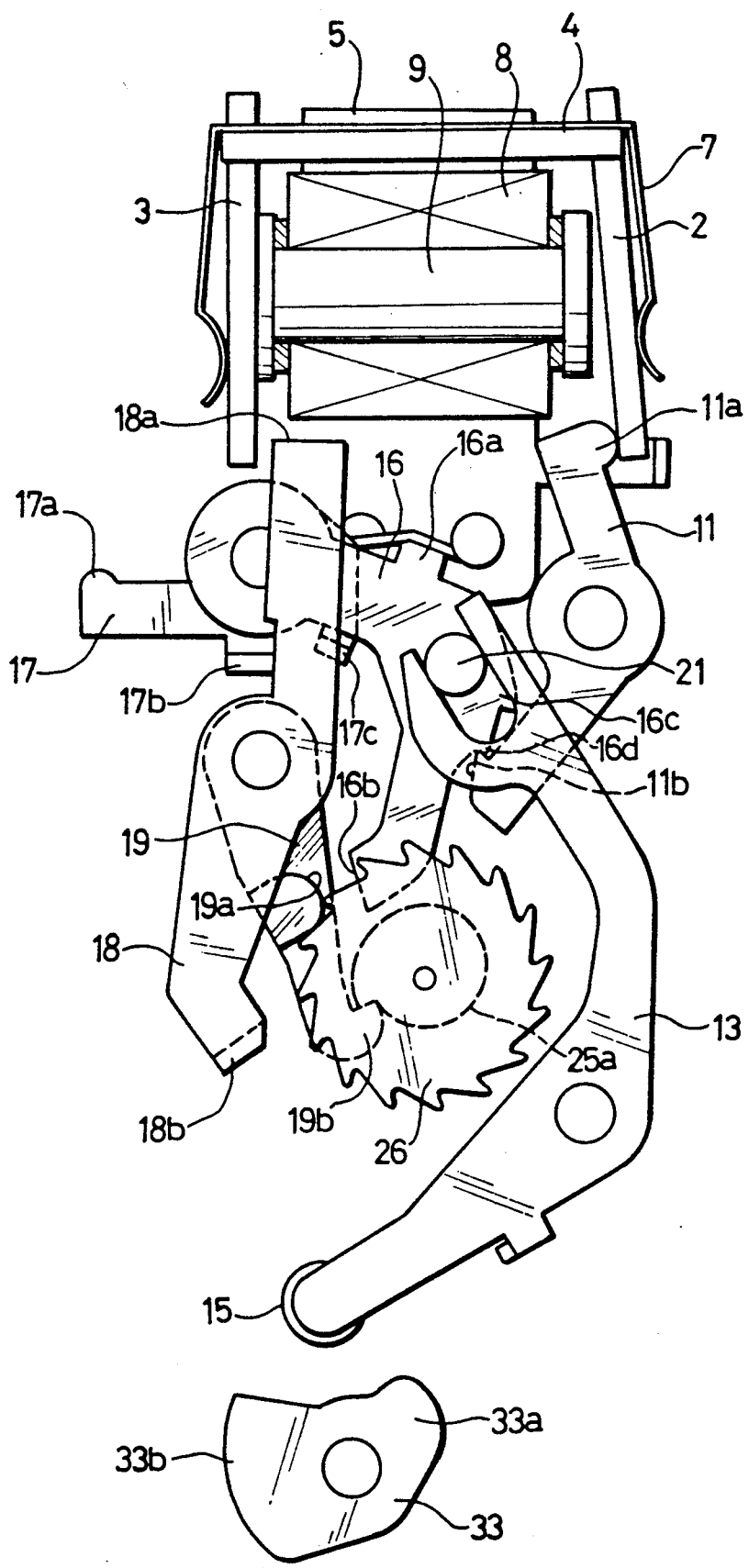
FIGS. 6 to 15 are side elevations of assistance in explaining the operation of a shutter release mechanism.

When the shutter release mechanism is in an initial state as shown in FIG. 6, the hook 19b of the aperture stop lever 19 is in engagement with the cam 25a of the diaphragm gear 25 to hold the action of the diaphragm driving spring 42 and the diaphragm overcharge spring 44. On the other hand, the second tooth 16d of the release trigger lever 16 is in engagement with the hook 11b of the release stop lever 11 to hold the action of the spring 14 provided on the release charge lever 13. In this state, the armature 2 is separated from the corresponding end of the core 9, the diaphragm stop lever 18 is turned clockwise by the counterclockwise turning action of the projection 17b of the mirror release lever 17 to a position where the finger 18a thereof is in contact with the projection 38b of the diaphragm base plate 38 (FIG. 1), a predetermined gap is formed between the armature 3 and the finger 18a of the diaphragm stop lever 18, the armature 3 is pressed against the corresponding end of the core 9 by the springs 7, and the projection 17c of the mirror release lever 17 and the release trigger lever 16 are separated from each other.

Figure 7:
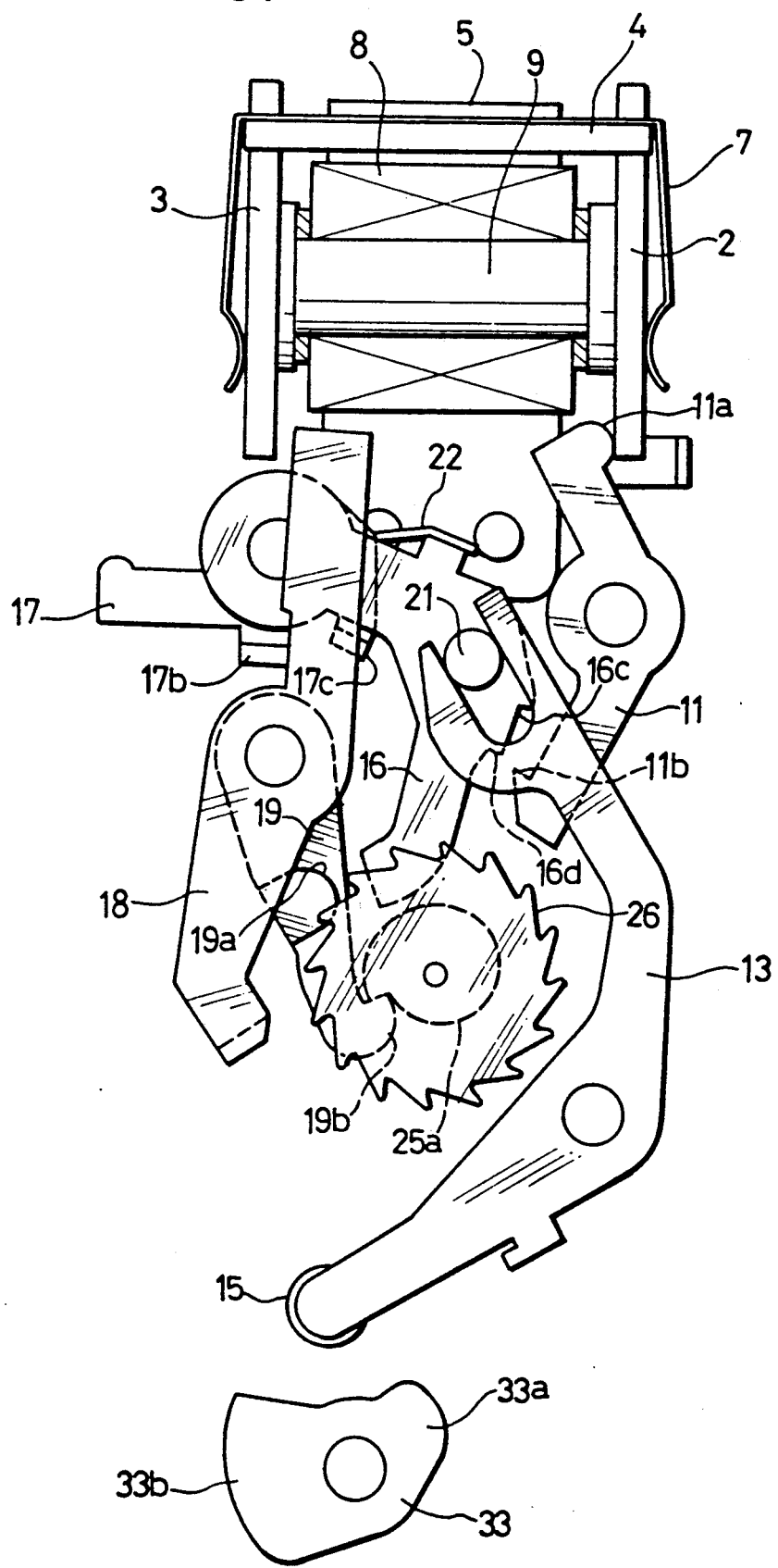
Figure 8:
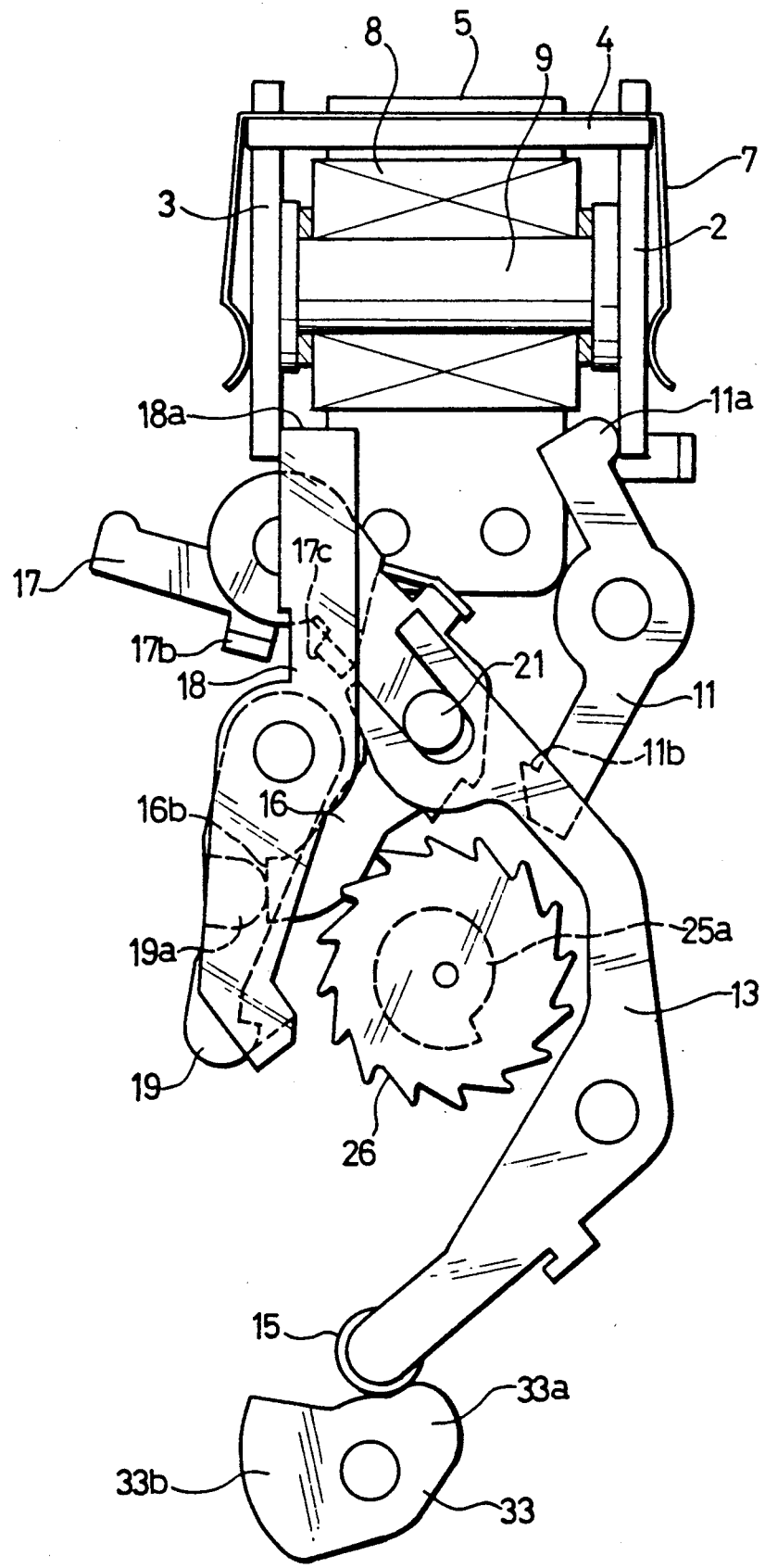

When the coil 8 is energized, the armature 2 is attracted to the core 9 (FIG. 7), whereby the release stop lever 11 is turned counterclockwise to release the release trigger lever 16. Consequently, the release trigger lever 16 and the release charge lever 13 start being turned by the release charge lever spring 14 and the release overcharge spring 22. When the release trigger lever 16 is turned through an angle of about 5° as shown in FIG. 8, the release trigger lever 16 hits against the projection 17c of the mirror release lever 17. Thereafter, the release trigger lever 16 is supported integrally with the mirror release lever 17 by the urging force of the release overcharge spring 22, and the release trigger lever 16 turns together with the mirror release lever 17. Since the projection 17b of the mirror release lever 17 moves away from the diaphragm stop lever 18, the diaphragm stop lever 18 is allowed to start turning in a counterclockwise direction. Since the armature 3 is attracted to the core 9, the counterclockwise turning motion of the diaphragm stop lever 18 is checked upon the collision of the finger 18a on the armature 3. The release trigger lever 16 and the mirror release lever 17 continue to turn further after the diaphragm stop lever 18 has been stopped. Then the free end 16b of the release trigger lever 16 kicks the projection 19a of the aperture stop lever 19 to release the cam 25a (hence the gear 25) from the release trigger lever 19, so that the diaphragm operating mechanism starts its action. That is, the preset ring, not shown, engaging the preset ring pinion 45 is turned to adjust the aperture of the diaphragm to a desired aperture. The electric current supplied to the coil 8 is decreased after the coil 8 is once activated for the above release operation, i.e., at a moment in a period between the activation of the coil 8 and a moment when moving of the diaphragm is stopped, namely, when the diaphragm operating mechanism is stopped. The electric current is decreased (1) when a pulse corresponding to the reduction of aperture by one step is outputted from the photoelectric detector 28 or (2) a predetermined time after the coil 8 has been energized. The electric current is thus decreased to save power, because the magnetic resistance of the magnetic circuit decreases and the magnetic flux density is saturated when the armature 2 is attracted to the core 9, and hence the core 9 can firmly attract the armature 2 even if the electric current is decreased. Furthermore, the decrease of the electric current in such a mode avoids continuous supply of a large current even if the subsequent operation, i.e., the shutter release mechanism malfunctions. Thus, the aperture is decreased continuously while the photoelectric detector 28 counts pulses corresponding to the angular movement of the aperture code plate 24. Upon the coincidence of the number of pulses counted by the photoelectric detector with a value corresponding to a desired aperture, the supply of current to the coil 8 is stopped. Consequently, the core 9 becomes inoperative to release the armature 3. Then, the diaphragm stop lever 18 is turned counterclockwise (FIG. 9) and thereby the hook 18b of the diaphragm stop lever 18 engages the ratchet wheel 26 to check the diaphragm operating mechanism. In setting the diaphragm for open aperture, the supply of electric current to the coil 8 is stopped by a switch S100 (FIGS. 2 and 4) controlled by the release trigger lever 16 turning ahead of the aperture stop lever 19, because no sufficient time is available for setting the diaphragm for open aperture before the aperture decreasing operation is started if the interruption of supply of current to the coil 8 before the start of the aperture decreasing operation is impossible. The switch S100 is attached to a plate 101 fixed to the third diaphragm base plate 41 (FIG. 4).

Operation of the Mirror Release Mechanism

Referring to FIG. 16, as the release trigger lever 16 and the mirror release lever 17 turn together (FIGS. 8 and 9), the end 17a of the mirror release lever 17 kicks up the mirror stop lever 53 at the bent portion 53a of the same to turn the mirror stop lever 53 counterclockwise. Consequently, the finger 53b of the mirror stop lever 53 and the projection 63c of the shutter charge lever 63 are disengaged, and then the driving spring 68 (FIG. 1) turns the shutter charge lever 63 counterclockwise and turns the charge levers 67 and 70 clockwise. Although the shutter charge pin 62 is retracted from the shutter setting lever, not shown, at the same time, the leading and trailing curtains of the shutter remain unmoved, since a leading curtain holding electromagnet and a trailing curtain holding electromagnet have previously been energized. The link plate 55 of the quadric link consisting of the driving lever 64, the connecting pin 65, the link plate 55, the connecting pin 56 and the main mirror holder 60 moves upward substantially along a straight line to raise the main mirror holder 60 and the main mirror 83. Meanwhile, the bound arresting lever 54 turns clockwise as the shutter charge lever 63 turns counterclockwise, to come into contact with the connecting pin 56 from below the connecting pin 56 upon the arrival of the main mirror holder 60 at the uppermost position to restrain the main mirror 83 from bounding after reaching the uppermost position.

Restoring Action of Shutter Release and Mirror Release Mechanisms

The restoring action of the shutter release mechanism and the mirror release mechanism will be described hereinafter with reference to FIGS. 1 through 19.

Figure 9:
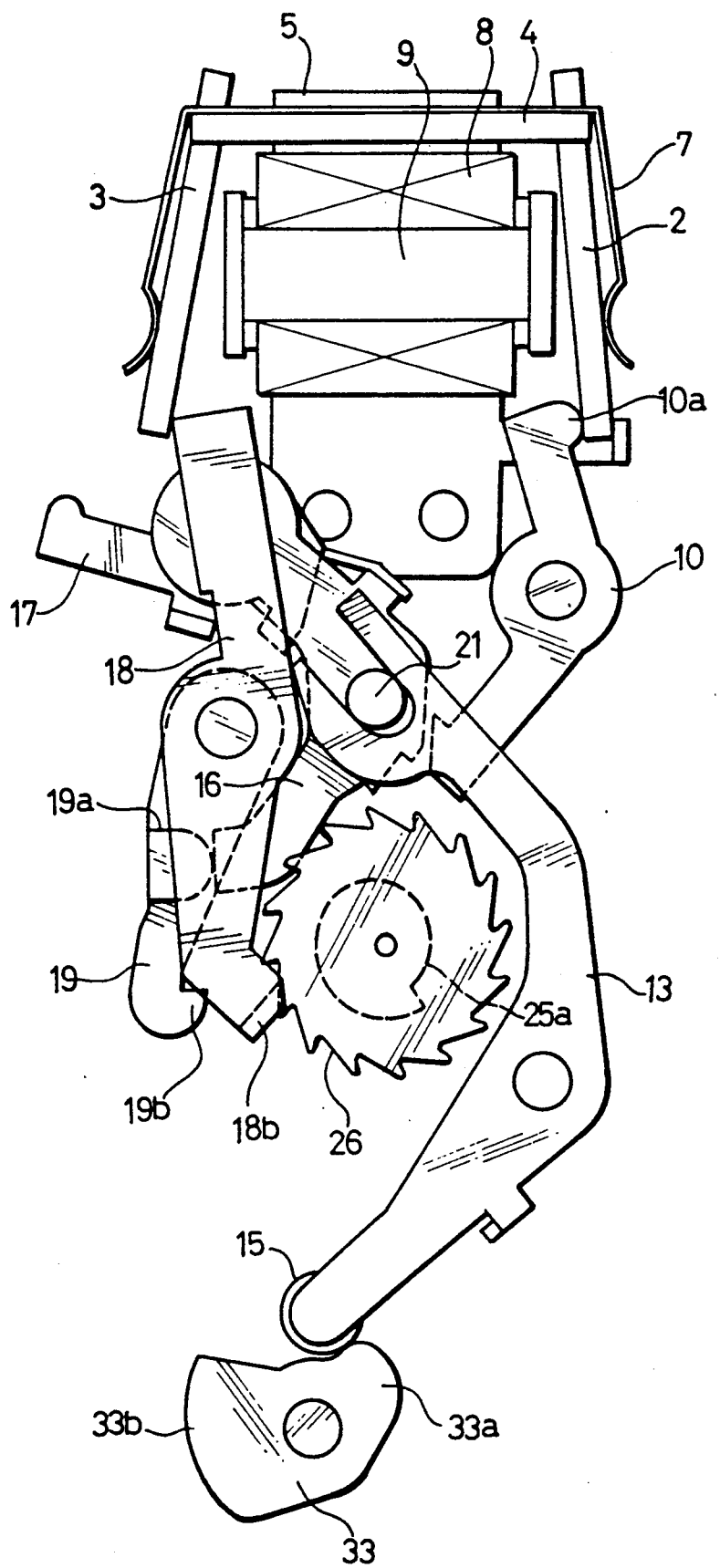
Figure 10:
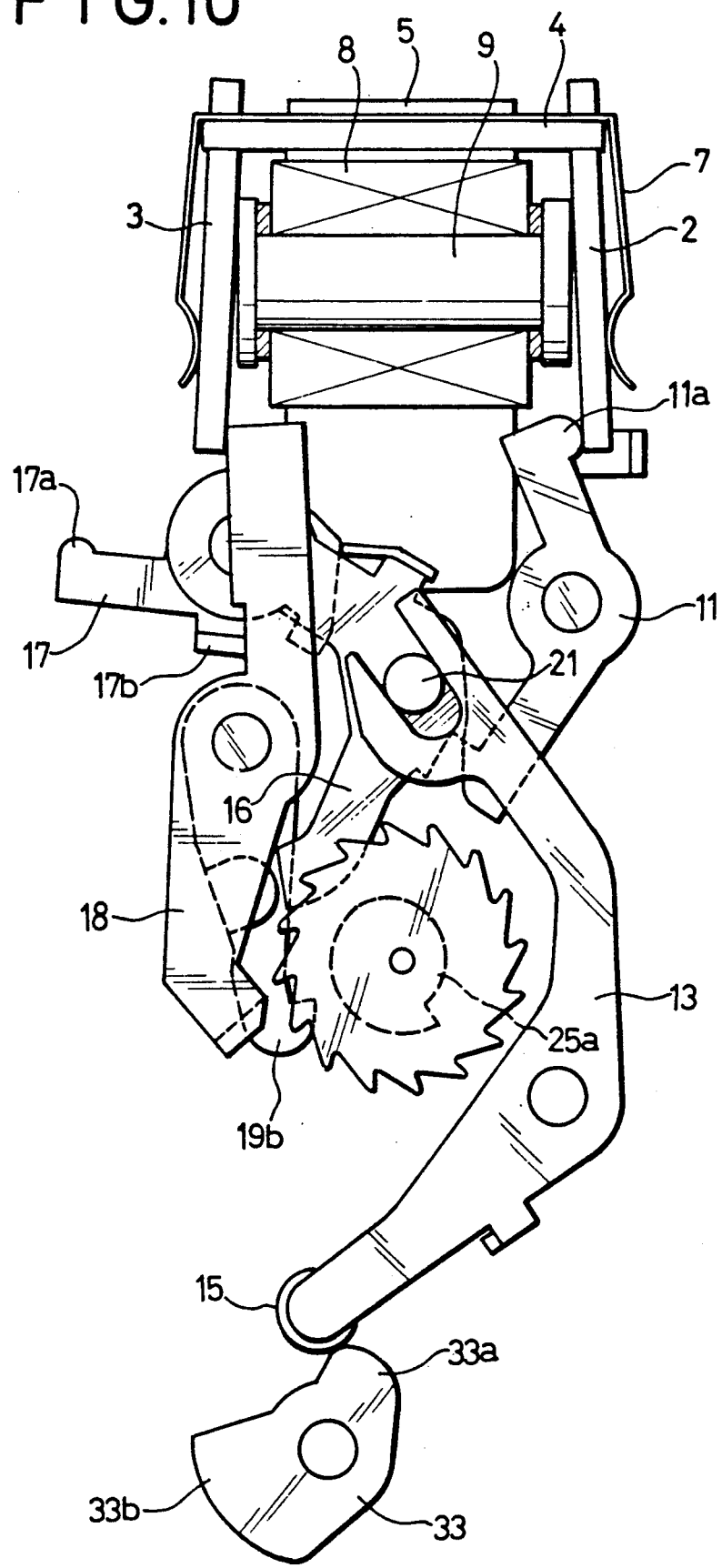
Figure 11:
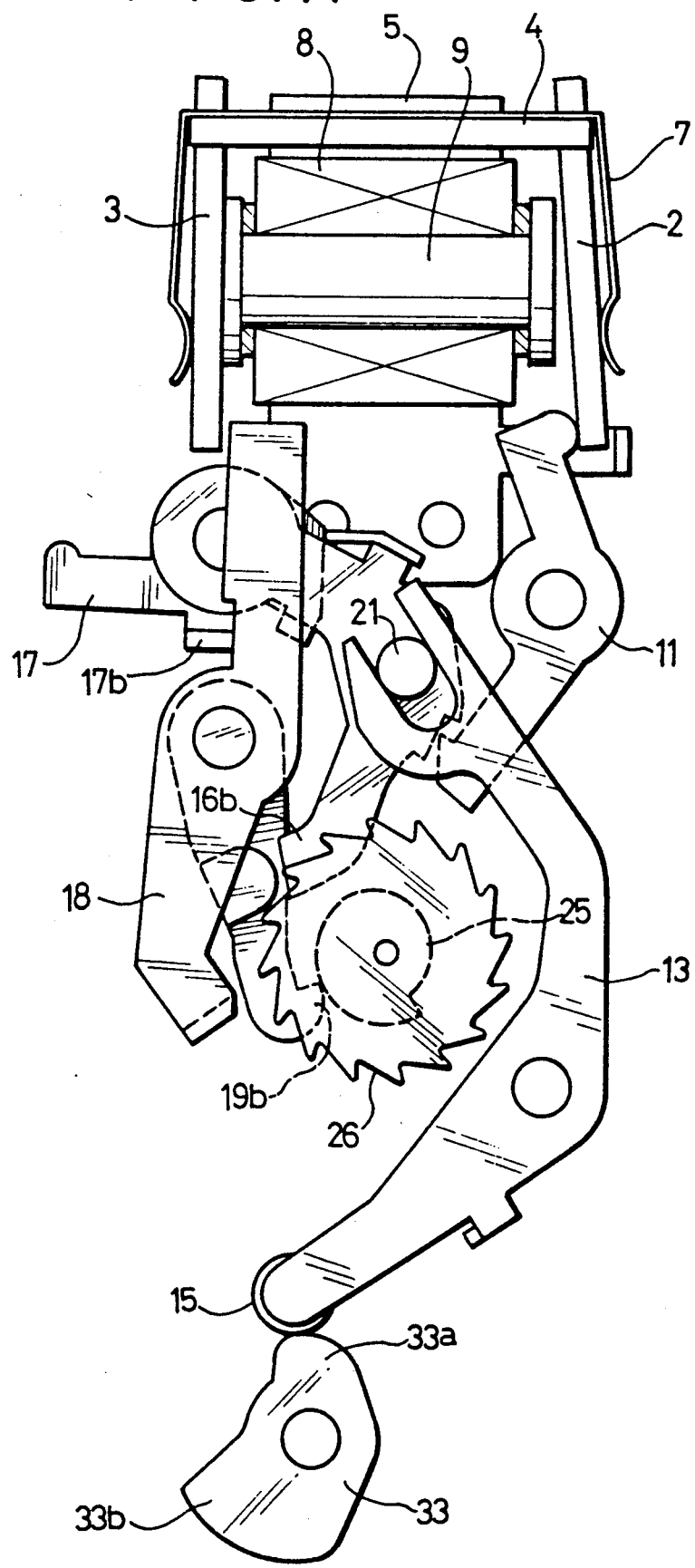

A restoring and winding motor, not shown, is actuated to drive a restoring and winding gear, not shown, which turns substantially through one full turn for one restoring and winding cycle, through a reduction gear train. Then, the first bevel gear 35 engaging a partly blank gear formed integrally and coaxially with the restoring and winding gear is rotated clockwise. Consequently, the second bevel gear 34 engaging the first bevel gear 35 is rotated counterclockwise and the release charge cam 33 is turned counterclockwise. Then, as shown in FIGS. 10 and 11, the cam segment 33a of the release charge cam 33 engages the cam follower 15 to turn the release charge lever 13 clockwise, and thereby the release trigger lever 16 is turned counterclockwise. The mirror release lever 17 interlocked with the release trigger lever 16 by the release overcharge spring 22 is turned counterclockwise and the projection 17b of the mirror release lever 17 applies pressure to the diaphragm stop lever 18 in an attempt to disengage the hook 18b from the ratchet wheel 26. However, the hook 18b cannot be disengaged from the ratchet wheel 26 because the friction between the hook 18b and the ratchet wheel 26 is greater than the pressure (FIG. 9). Upon the separation of the free end 16b of the release trigger lever 16 from the projection 19a of the aperture stop lever 19, the aperture stop lever 19 is allowed to turn counterclockwise. However, the ratchet wheel 26 remains free until the hook 19b engages the cam 25a combined with the gear 25.

On the other hand, after the second bevel gear 34 has been rotated counterclockwise through a predetermined angle, the rotation of the second bevel gear 34 is transmitted to the clutch gear 32, and thereby the gear 25 is rotated clockwise through the first speed increasing gear 31 and the second speed increasing gear 30 by the clutch gear 32. Then, the diaphragm stop lever 18 is turned by the mirror release lever 17 and the hook 18b is disengaged from the ratchet wheel 26 because the friction between the hook 18b of the diaphragm stop lever 18 and the ratchet wheel 26 vanishes when the gear 25, hence the ratchet wheel 26, is turned clockwise (FIG. 10).

Figure 12:
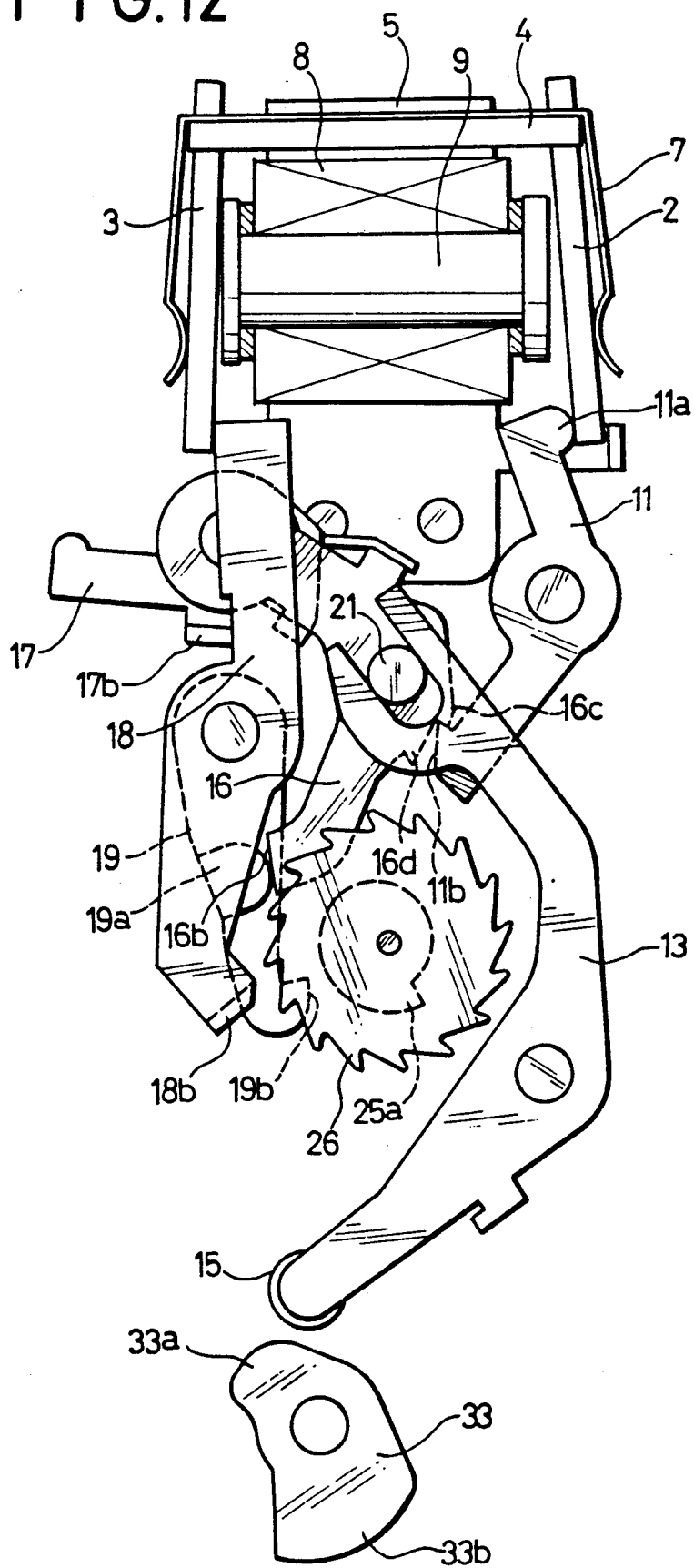
Figure 13:
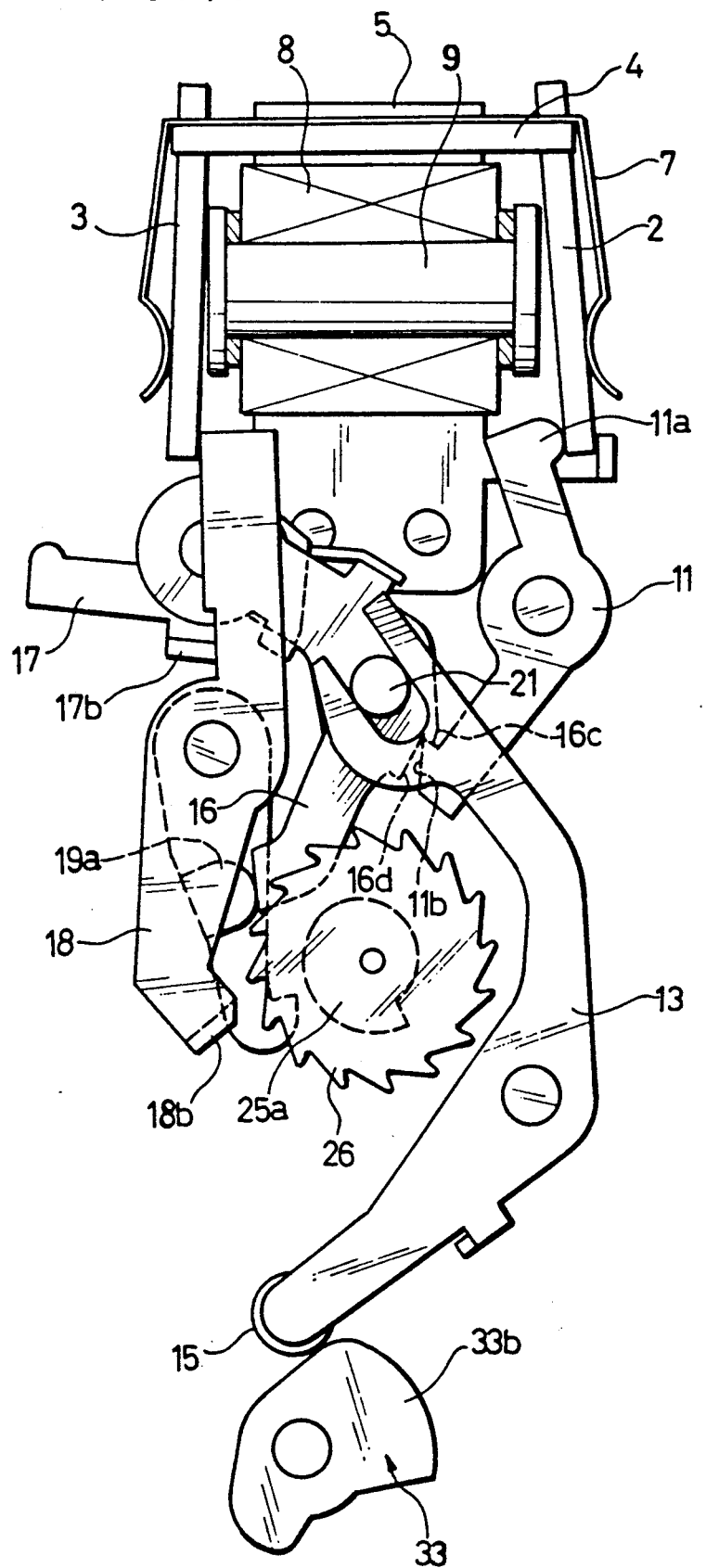

Then, upon the passage of the cam follower 15 through the cam segment 33a of the release charge cam 33 as shown in FIG. 12, the hook 11b of the release stop lever 11 engages the first tooth 16c of the release trigger lever 16.

Figure 14:
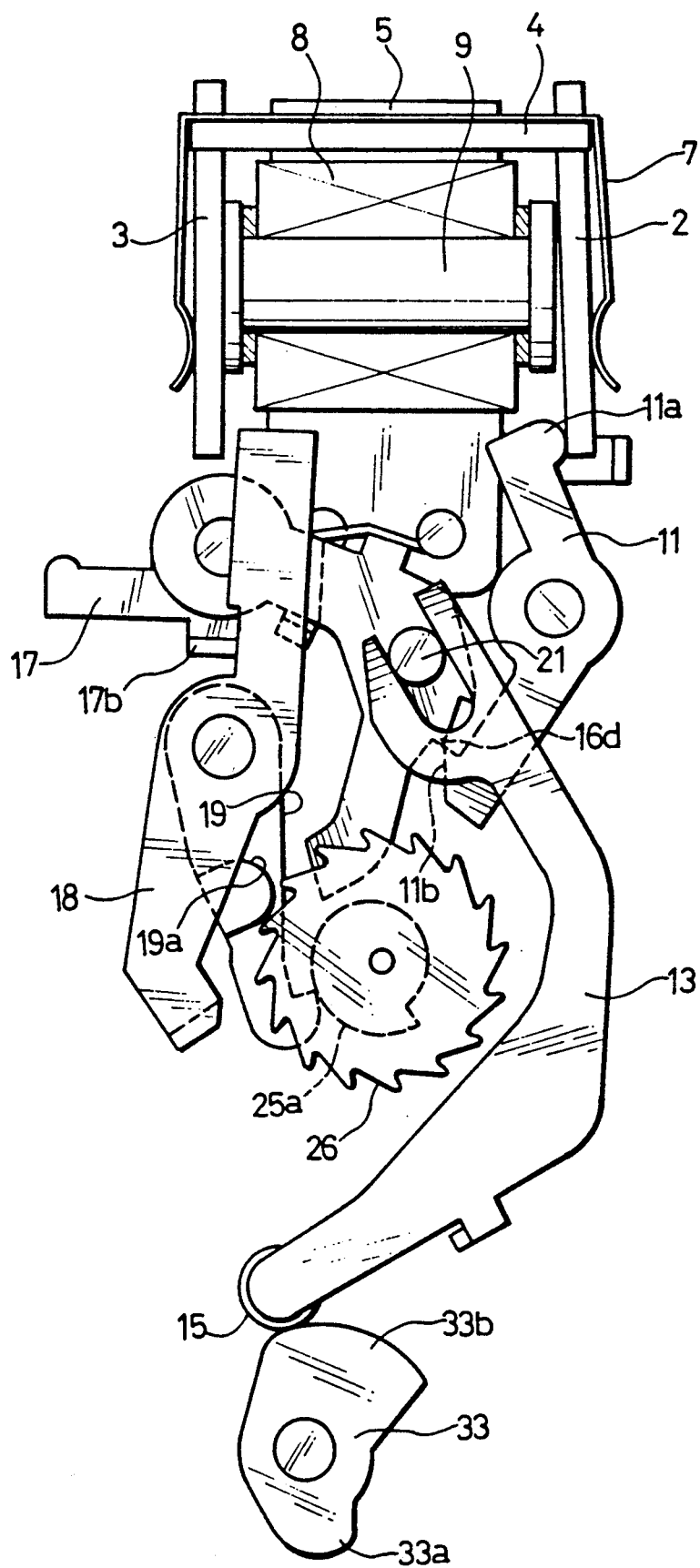
Figure 15:
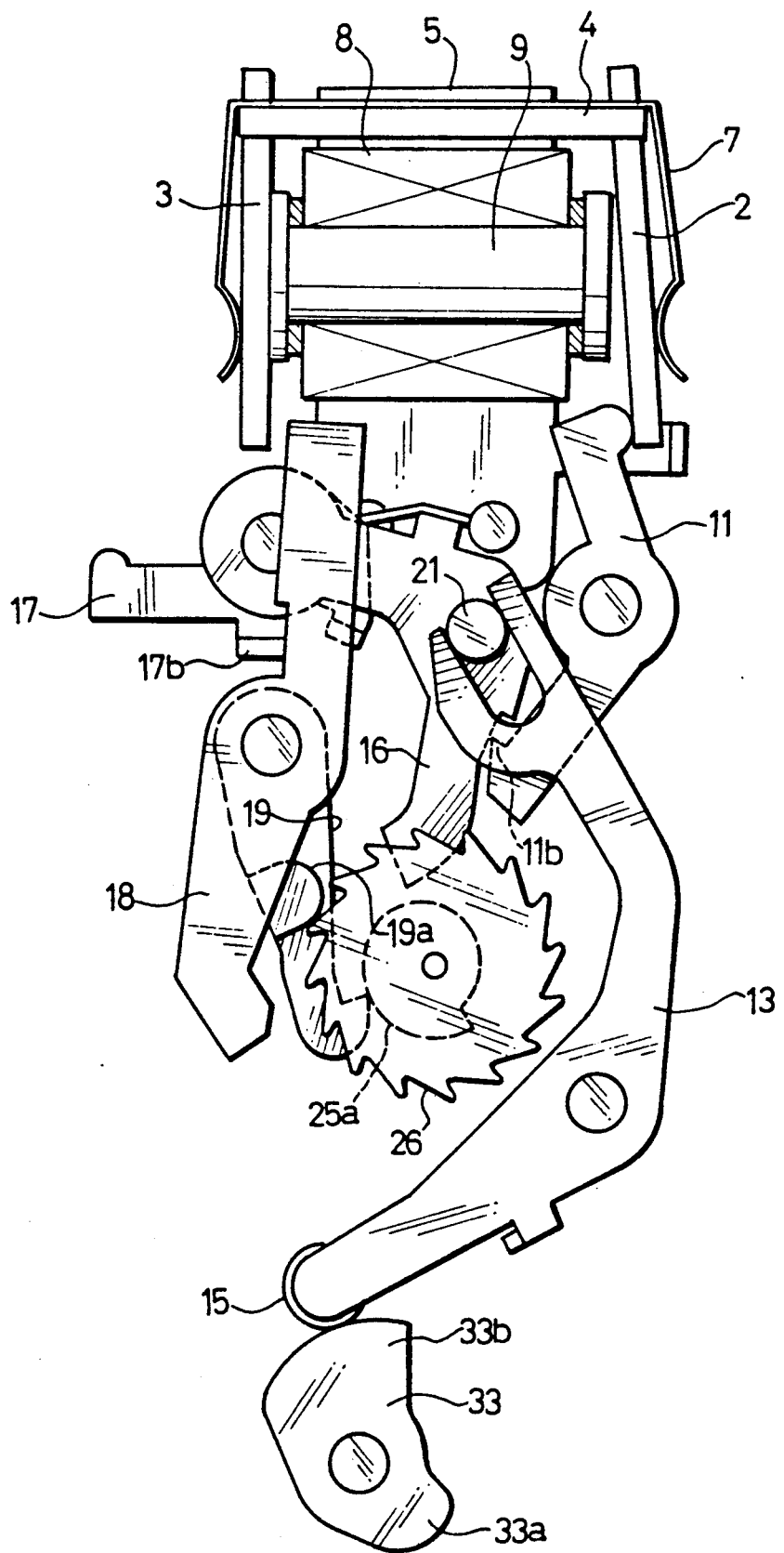

As the release charge cam 33 is turned further, the cam segment 33b of the release charge cam 33 engages the cam follower 15 to turn the shutter release trigger lever 16 counterclockwise again. Consequently, the aperture stop lever 19 is turned further counterclockwise to a position for engaging the cam 25a (FIGS. 14 and 15). The diaphragm stop lever 18 is turned clockwise by the counterclockwise turning of the mirror release lever 17 and the finger 18a of the diaphragm stop lever 18 is separated from the armature 3. Consequently, the armature 3 is pressed against the core 9 by the springs 7, and the release trigger lever 16 and the release stop lever 11 are disengaged (FIGS. 14 and 15).

Since the diaphragm clutch gear 32 is in engagement with the first speed increasing gear 31, the rotation of the first speed increasing gear 31 is transmitted to the diaphragm operating mechanism and the diaphragm control mechanism. Then, the first speed increasing gear 31 is rotated clockwise to rotate the second speed increasing gear 30 and the transmission gear 43 counterclockwise.

The rotation of the transmission gear 43 is transmitted through the diaphragm overcharge spring 44 to the preset pinion 45 engaging the preset ring, not shown, and thereby the preset ring is turned clockwise, namely, in a direction to open the aperture, to charge the diaphragm driving spring 42.

Meanwhile, the second speed increasing gear 30 rotates the gear 25 clockwise to bring the cam 25a to a position into engagement with the aperture stop lever 19 waiting for the cam 25a at an engagable position near the end of the restoration cycle. Then, the partly blank gear and the first bevel gear 35 are disengaged and the cam 25a and the hook 19b of the aperture stop lever 19 are engaged to terminate the operation of the diaphragm operating mechanism. Then, the first bevel gear 35 and the second bevel gear 34 are returned automatically to the respective initial positions thereof by the diaphragm return spring 36 as shown in FIG. 6.

In the mirror release mechanism, a cam formed integrally with the gear, not shown, which turns one full turn for one restoration cycle, acts on the charge roller 72 to turn the charge lever 70 counterclockwise against the resilience of the driving spring 68, and the charge lever 67 is turned counterclockwise by the overcharge spring 73. Subsequently, the shutter charge lever 63 is turned clockwise to turn the shutter setting lever of the shutter unit, not shown. The clockwise turning motion of the shutter charge lever 63 is stopped upon the engagement of the projection 63c of the shutter charge lever 63 with the finger 53b of the mirror stop lever 53.

Meanwhile, the mirror return spring 66 drives the quadric link to move the link plate 55 downward, so that the main mirror 83 is returned to its lower position.

Exposure Control Circuit

An exposure control circuit, by way of example, will be described hereinafter with reference to FIGS. 20, 21(a), 21(b), 22 and 23.

Referring to FIG. 20, the exposure control circuit comprises a microcomputer C for exposure control, a lens control circuit LE connected through a data bus to BUS1 of the microcomputer C, a photometric circuit LI connected through a data bus to BUS2 of the microcomputer C, and an aperture pulse detecting circuit A connected to an input port IP4 of the microcomputer C.

Also shown in FIG. 20 are an electromagnet 1cMg for holding the leading curtain of the shutter, an electromagnet 2cMg for holding the trailing curtain of the shutter, an electromagnet RFMg for releasing the shutter and stopping the diaphragm, transistors Q3 and Q4 respectively for controlling the electromagnets 1cMg and 2cMg, and transistors Q1 and Q2 for controlling the electromagnet RFMg. The bases of the transistors Q3 and Q4 are connected to output ports OP3 and OP4 of the microcomputer C, respectively. The transistors Q1 and Q2 are connected in parallel with each other and connected to the electromagnet RFMg and the bases thereof are connected to output ports OP1 and OP2 of the microcomputer, respectively.

Indicated at S1 is a switch which is closed when the shutter release button is depressed for a first step, at S2 is a switch which is closed when the shutter release button is depressed for a second step, and at S100 is the switch which is controlled by the release trigger lever 16.

Figure 21A:
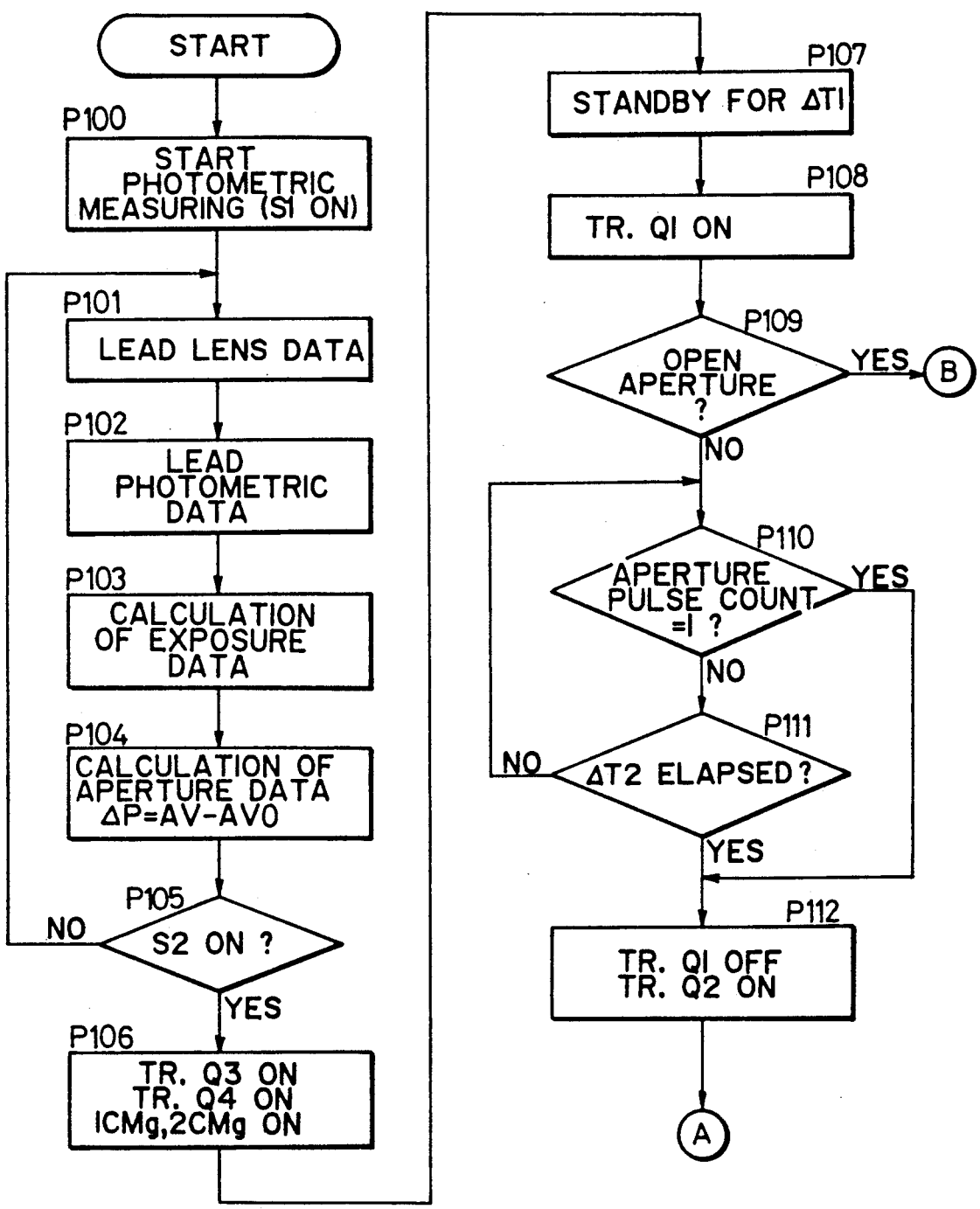
FIGS. 21(a) and 21(b) are flow charts of assistance in explaining the operation of the exposure control circuit of FIG. 20.
Figure 21B:
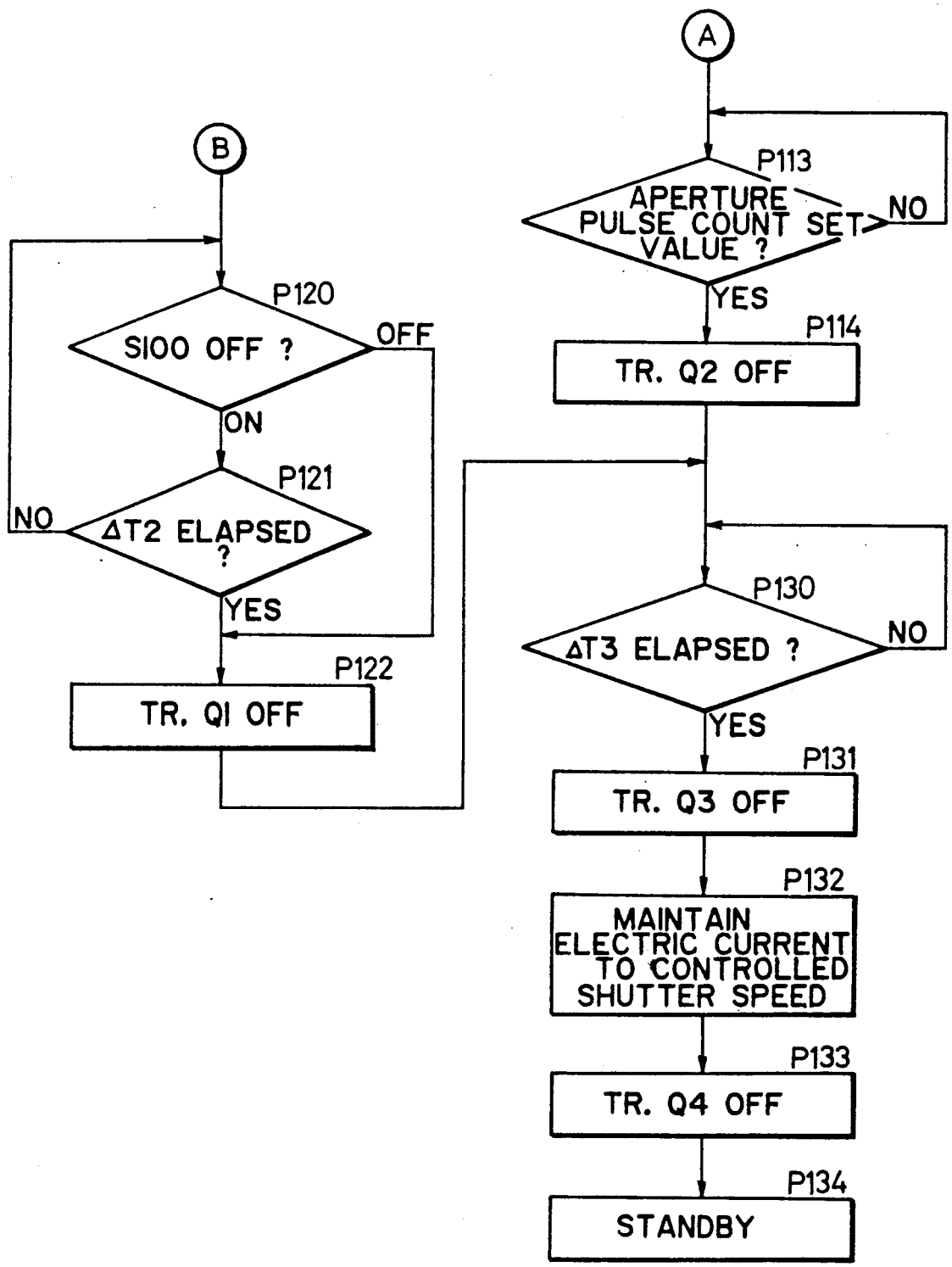
Figure 22:
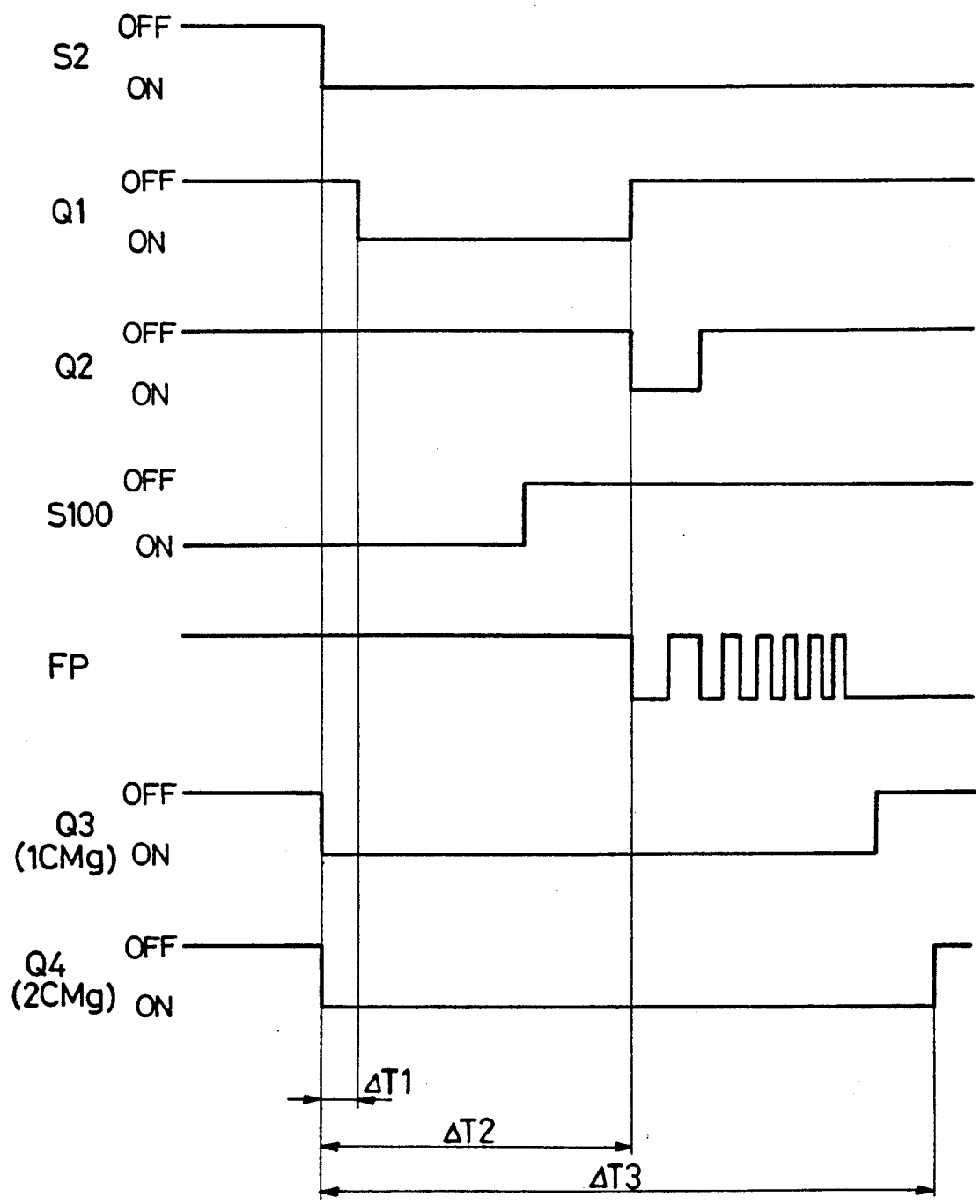
FIG. 22 is a time chart of signals for an ordinary diaphragm control operation.
Figure 23:
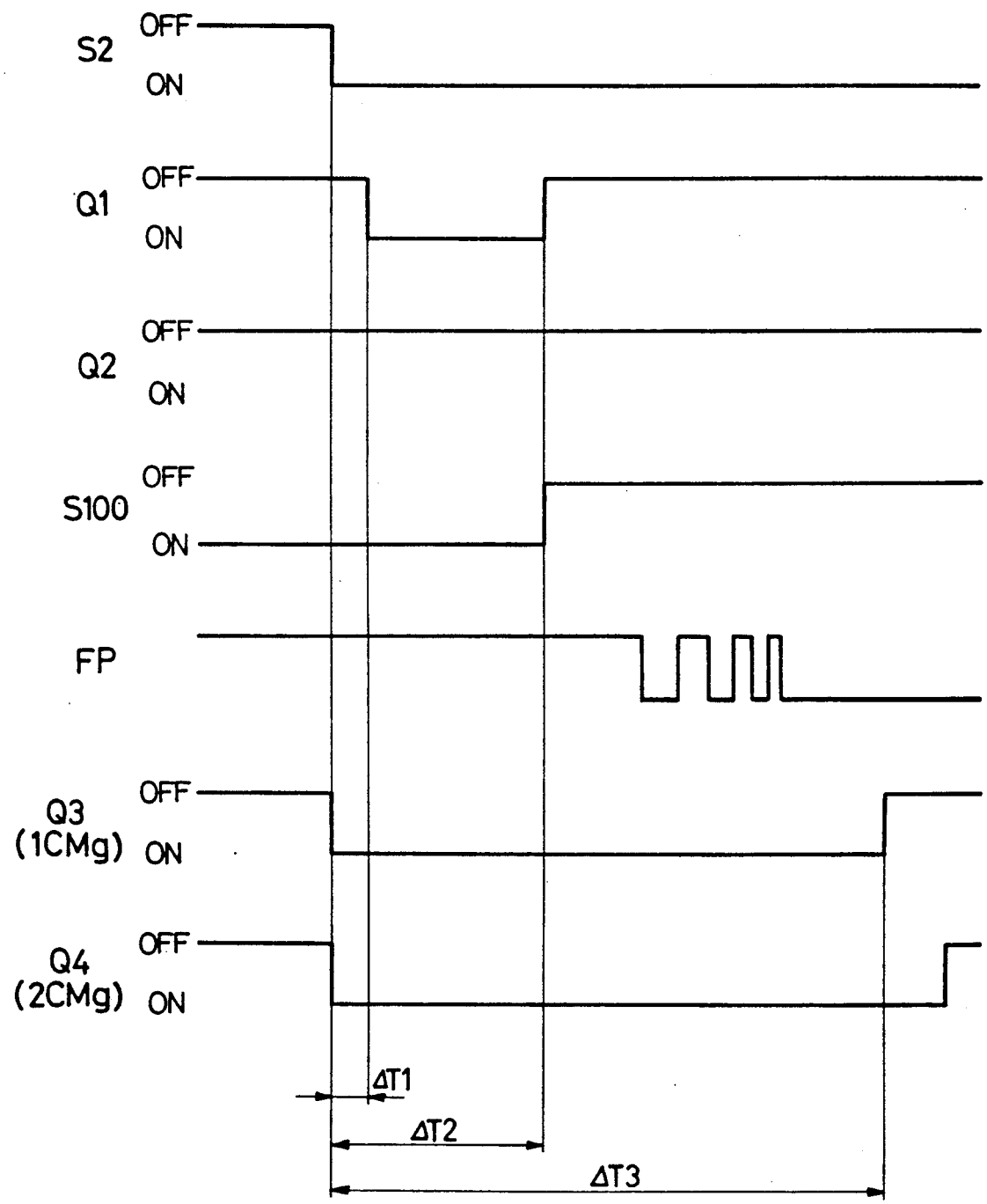
FIG. 23 is a time chart of signals for a diaphram control operation for open aperture.

The operation of the exposure control circuit will be described hereinafter with reference to flow charts shown in FIGS. 21(a) and 21(b), and time charts shown in FIGS. 22 and 23.

Step P100: The switch S1 is closed by depressing the shutter release button for the first step to give a photometric measurement start instruction.

Step P101: The microcomputer C reads the data of the lens (maximum aperture data AVo minimum aperture data AVmax) from the lens control circuit LE.

Step P102: The microcomputer receives measured photometric data from the photometric circuit LI.

Step P103: The microcomputer processes the data of the lens, and the measured photometric data to determine an appropriate aperture AV and an appropriate shutter speed TV for which the camera is to be set.

Step P104: An aperture control input ΔP is calculated by using an expression:

$$\Delta P = AV - AVo$$

Step P105: A check is made to decide if the shutter release button has been depressed for a second step to close the switch S2 for actuating the shutter. When the decision is negative, the program returns to step P101. When the decision is affirmative, the program goes to step P106.

Step P106: The transistors Q3 and Q4 are turned on to energize the electromagnets 1cMg and 2cMg. Consequently, the leading and trailing curtains are held.

Step P107: The state of step P106 is maintained for a standby time ΔT1 before going to the next step.

Step P108: The transistor Q1 is turned on to supply a release current to the electromagnet RFMg.

Step P109: A check is made to decide if the desired aperture of the diaphragm is an open aperture. The program goes to step P120 when the decision is affirmative or goes to step P110 when the decision is negative.

Step P120: A check is made to see if the switch S100 (FIGS. 2 and 4) is open. The program goes to step P122 when the decision is affirmative or goes to step P121 when the decision is negative.

Step P121: A check is made to decide if a predetermined time ΔT2 has elapsed after the switch S2 was closed. The program returns to step P120 when the decision is negative or goes to step P122 when the decision is affirmative.

Step P122: The transistor Q1 is turned off to stop the supply of the release current, and then the program jumps to step P130.

Step P110: A check is made to decide if the aperture pulse count is "1". The program goes to step P112 when the decision is affirmative or goes to step P111 when the decision is negative.

Step P111: A check is made to decide if the predetermined time ΔT2 has elapsed. The program returns to step P110 when the decision is negative or goes to step P112 when the decision is affirmative.

Step P112: The transistor Q1 is turned off while the transistor Q2 is turned on to supply a diaphragm control current to the electromagnet RFMg.

Step P113: A check is made to decide if the aperture pulse count has reached a predetermined value. The check is repeated until an affirmative response is received. When the decision is affirmative, the transistor Q2 is turned off at step P114 to stop the supply of the diaphragm control current.

Step P130: A check is made to decide if a predetermined time ΔT3 has elapsed after the transistors Q3 and Q4 were turned on in step P106. The check is repeated until an affirmative response is received. When the decision is affirmative, the program goes to step P131.

Step P131: The transistor Q3 is turned off to de-energize the electromagnet 1cMg for holding the leading curtain, so that the leading curtain starts running.

Step P132: The current state is maintained for a time period corresponding to a controlled shutter speed.

Step P133: The transistor Q4 is turned off to de-energize the electromagnet 2cMg holding the trailing curtain, so that the trailing curtain starts running.

Step P134: The microcomputer remains standing by.

Electromagnetic Actuator

The construction and operation of the electromagnetic actuator in a second embodiment according to the present invention will be described hereinafter with reference to FIGS. 24 to 31. The electromagnetic actuator in the second embodiment is substantially the same as the electromagnetic actuator M incorporated into the foregoing shutter-diaphragm control system in construction except that means employed in the second embodiment for applying pressure to the armatures is different from the spring 7 of the first embodiment.

Figure 24:
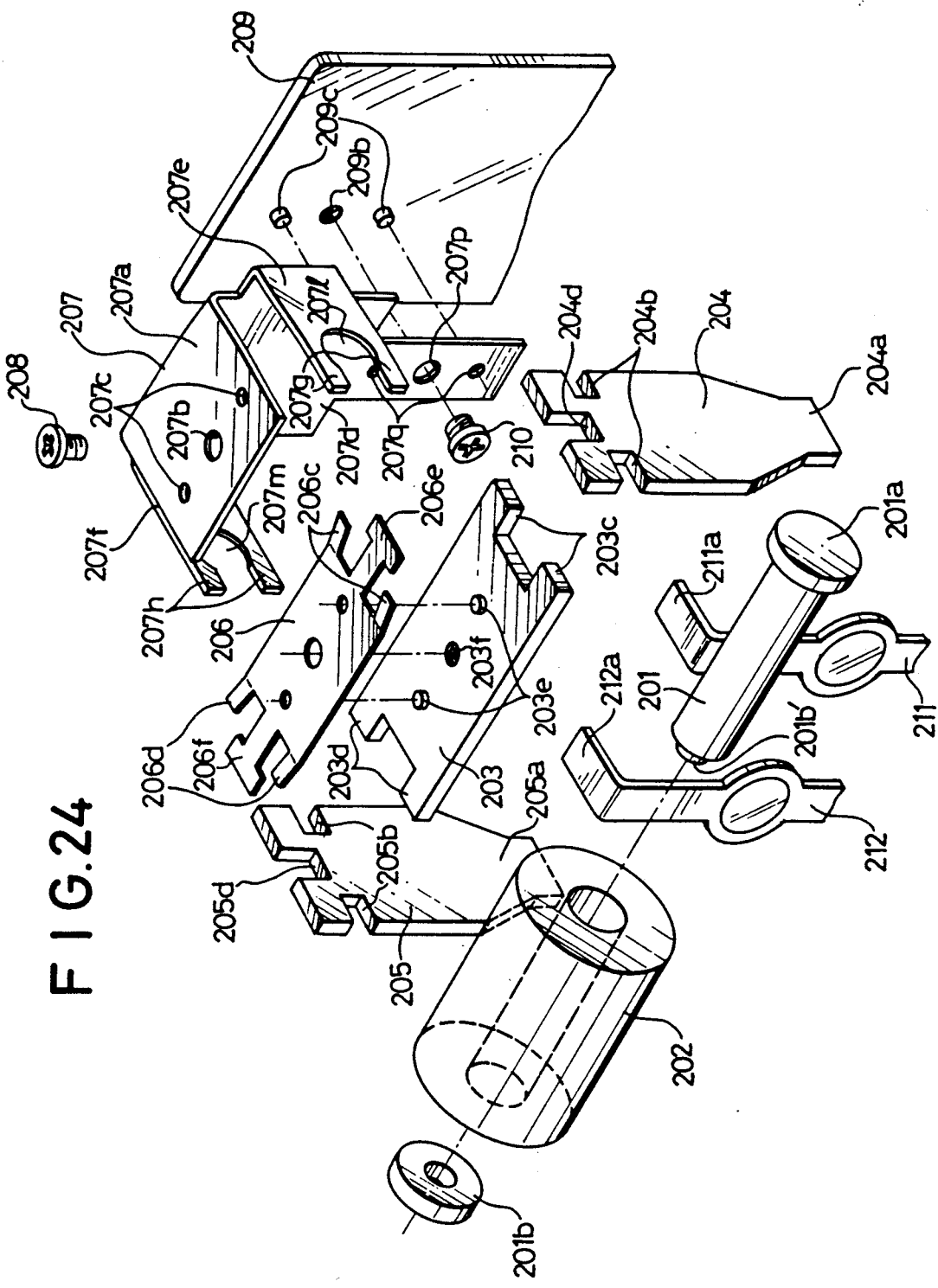
FIG. 24 is an exploded perspective view of an electromagnetic actuator in a second embodiment according to the present invention.

Referring to FIG. 24, there are shown a coil 202, a core 201 formed of a magnetic material and having one end integrally provided with a head 201a and the other end integrally provided with a projection 201b' having a reduced diameter to which a head 201b is fixed by welding or the like after inserting the core 201 in the coil 202. A yoke 203 forms a part of a magnetic path. The yoke has end projections 203c and 203d respectively at the opposite ends thereof and positions projections 203e formed on the upper surface thereof and a threaded hole 203f. Armatures 204 and 205 have side recesses 204b and 205b and top recesses 204d and 205d, respectively. A spring plate 206 is provided with side projections 206c and 206d formed respectively at the opposite ends thereof, and center projections 206e and 206f formed respectively at the center of the opposite ends thereof and respectively having expanded extremities. A magnet holder 207 has a horizontal wall 207a provided with positioning holes 207c, a vertical wall 207d extending at right angles from the rear side of the horizontal wall 207a, core holding arms 207e and 207f projecting to the front from the vertical wall 207d and provided respectively with pairs of fingers 207g and 207h at the extremities thereof. A base plate 209 is provided with positioning projections 209c in the surface facing the magnet holder 207. A first actuating lever 211 is associated with the armature 204 to actuate the aperture stop lever 18 of the foregoing shutter-diaphragm control system, and a second actuating lever 212 is associated with the armature 205 to actuate the release stop lever 11 of the foregoing shutter-diaphragm control system.

Figure 25:
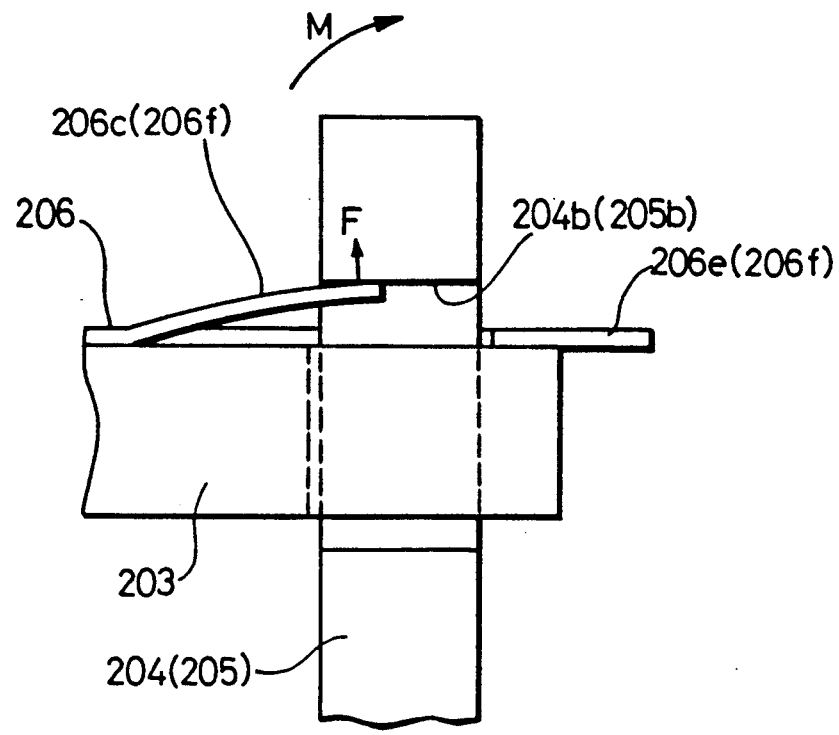
FIG. 25 is an enlarged view of assistance in explaining the operative relation between the yoke and armature of the electromagnetic actuator of FIG. 24, showing an essential portion of the electromagnetic actuator.

The armatures 204 and 205 are tapered to the lower ends having a reduced width. The projections 203c and 203d of the yoke 203 are received loosely in the side recesses 204b and 205b of the armatures 204 and 205, respectively, so as to allow the armatures 204 and 205 to swing relative to the yoke 203. The spring plate 206 is placed on the yoke 203 so as to receive the positioning pins 203e in the positioning holes thereof. The necks of the center projections 206e and 206f are received respectively in the top recesses 204d and 205d of the armatures 204 and 205 to keep the armatures 204 and 205 in place on the yoke 203. The side projections 206c and 206d are bent obliquely upward. The side projections 206c and 206d are received in the side recesses 204b and 205b of the armatures 204 and 205, respectively, and engage the respective inner half areas of the upper surfaces of the side recesses 204b and 205b of the armatures 204 and 205 to apply an upward force F to the armatures 204 and 205 as shown in FIG. 25. The yoke 203 and the spring plate 206 are fastened to the horizontal wall 207a of the magnet holder 207 by inserting a screw 208 through a hole 207b formed in the horizontal wall 207a and a hole formed in the spring plate 206 and screwing the same in the threaded hole 203f of the yoke 203. Portions of the core 201 between the heads 201a and 201b and the corresponding opposite ends of the coil 202 are received in recesses 207l and 207m defined by the pairs of fingers 207g and 207h, respectively. The vertical wall 207d is placed on the base plate 209 so as to receive the positioning projections 209c in the positioning holes 207q thereof, and then a screw 210 is inserted through a hole 207p formed in the vertical wall 207d and the same is screwed in a threaded hole 209b formed in the base plate 209 to fasten the magnet holder 207 to the base plate 209. The first actuating lever 211 and the second actuating lever 212 are disposed inside the armatures 204 and 205, respectively.

The first actuating lever 211 and the second actuating lever 212 correspond to the diaphragm stop lever 18 and the release stop lever 11 of the first embodiment, respectively.

Figure 26A:
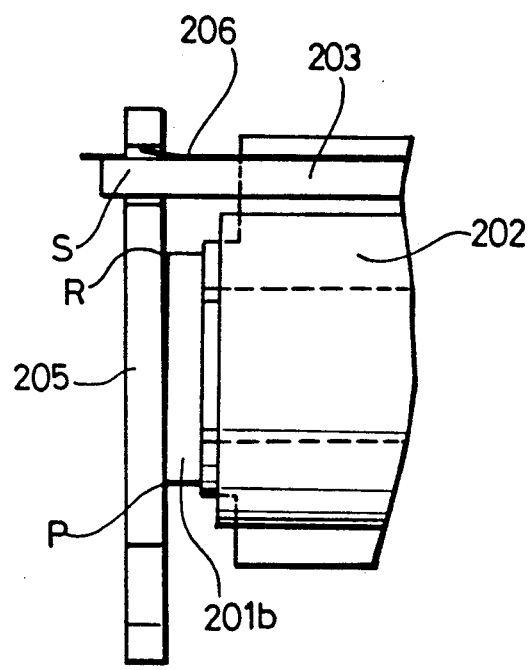
FIGS. 26(a), 26(b) and 26(c) are fragmentary side elevations of assistance in explaining the shape of the free end of a core.
Figure 26B:
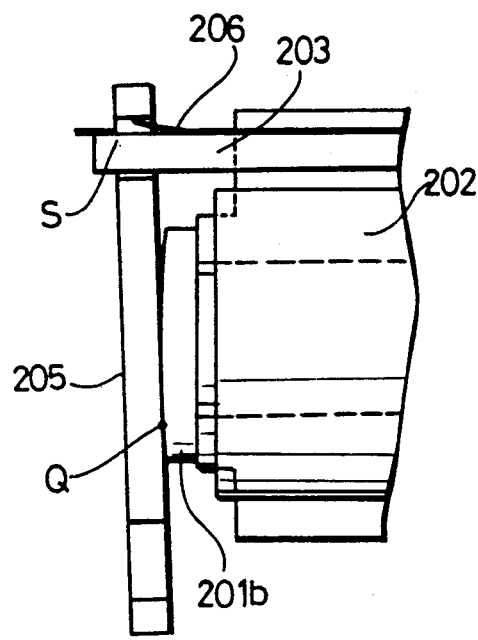

As shown in FIG. 26(b), each of the outer surfaces of the heads 201a and 201b is a convex surface, such as a portion of a spherical surface having a small curvature or a portion of a conical surface having a very large vertical angle. The heads 201a and 201b are formed so that the highest point Q of the convex surface is below the center axis of the core 201 as viewed in FIG. 26(b). Accordingly, when the armatures 204 and 205 are attracted respectively to the heads 201a and 201b of the core 201, the armatures 204 and 205 are in contact with the heads 201a and 201b at the highest points Q of the convex surfaces, respectively, and hence the distance between the highest point Q and a point S on which the armature swings is constant regardless of an aberration of positioning between the armature 204 (205) and the core 201. Furthermore, since each convex surface is a portion of a spherical surface having a small curvature or a portion of a conical surface having a very large vertical angle, gaps between the armatures 204 and 205 and the heads 201a and 201b are small, and hence the magnetic resistance of the magnetic path is small.

Figure 26C:
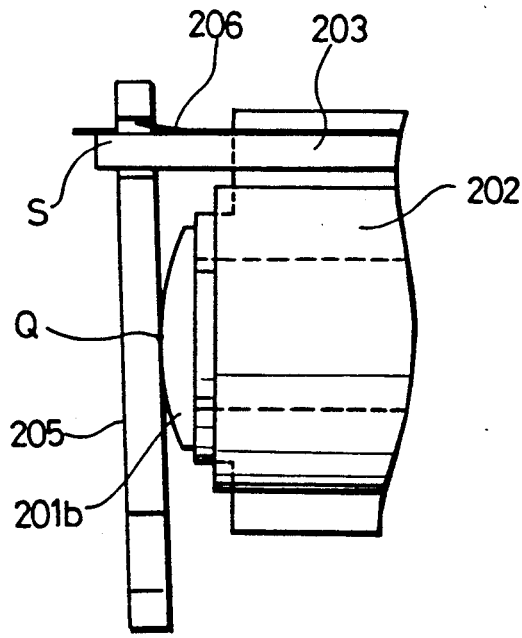

When the surface of the head 201b is flat as shown in FIG. 26(a), the position of the contact portion of the armature 205 with one side of the surface of the head 201b varies such as P or R because of an aberration of positioning between the armature 204 (205) and the core 201. When the surface of the head 201b is a portion of a spherical surface having a large curvature, a large gap is formed between the armature 205 and the surface of the head 201b as shown in FIG. 26(c). In either case, an increased gap is formed between the armature 205 and the surface of the head 201b, which reduces the attraction of the core 201.

The operation of the electromagnetic actuator will be described with reference to FIGS. 27 to 30 showing different phases of operation of the electromagnetic actuator.

Figure 27:
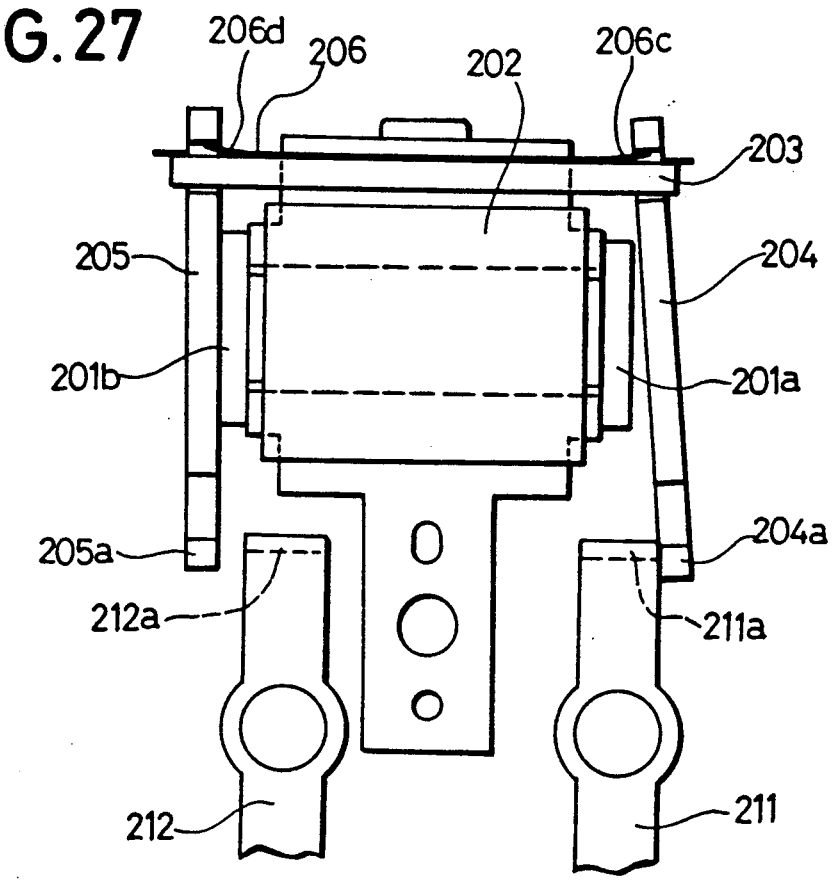
FIGS. 27 to 30 are illustrations of assistance in explaining the operation of the electromagnetic actuator of FIG. 24.

In the initial state shown in FIG. 27, the coil 202 is not energized. Since the second actuating lever 212 is separated from the armature 205, the armature 205 is in contact with the head 201b by the urging force of the spring plate 206. On the other hand, the first actuating lever 211 is urged clockwise and is stopped in a position shown in FIG. 27. Since the force urging the actuating lever 211 clockwise is greater than a force applied to the armature 204 by the projections 206c of the spring plate 206 to urge the armature 204 counterclockwise, the armature 204 is separated from the head 201a.

Figure 28:
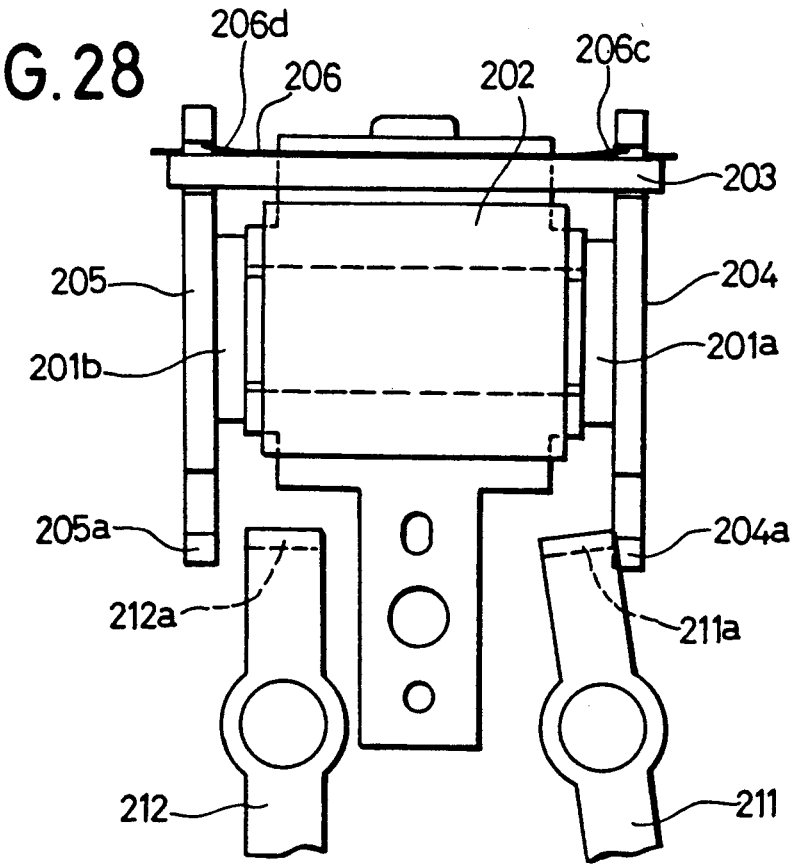

When the coil 202 is energized, a magnetic path is formed by the core 201, the armatures 204 and 205 and the yoke 203, and thereby the first armature 204 is attracted to the head 201a to turn the first actuating lever 211 counterclockwise as shown in FIG. 28. The armature 205 remains in contact with the head 201b.

Figure 29:
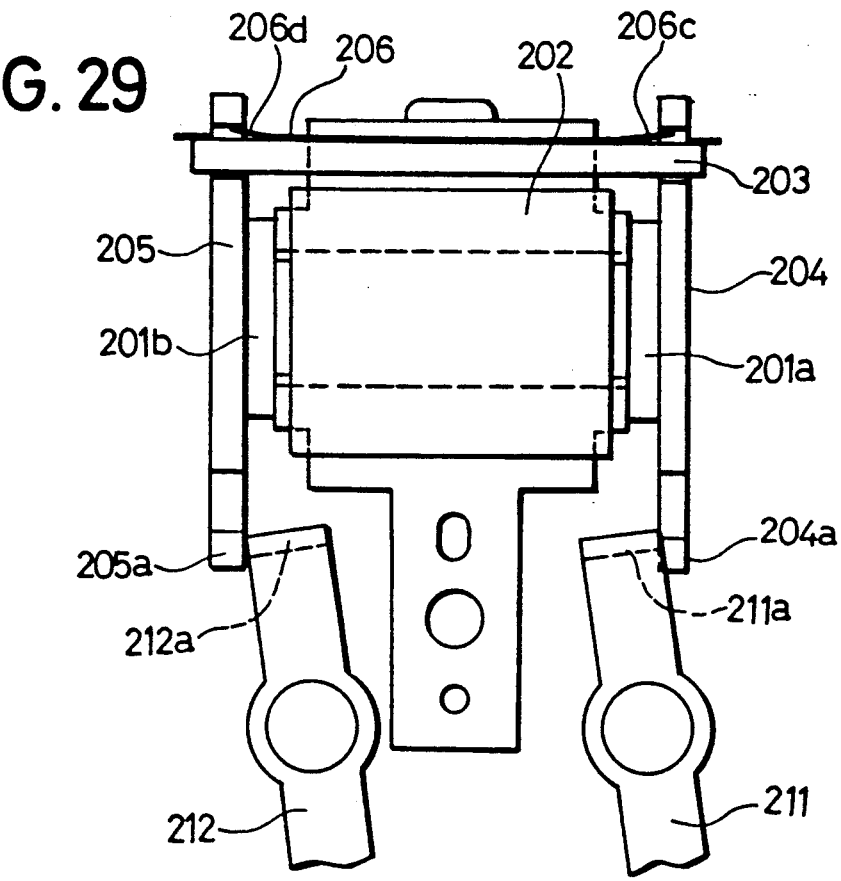

When the first actuating lever 211 is thus turned counterclockwise, the shutter-diaphragm control system is released and the second actuating lever 212 is turned counterclockwise as shown in FIG. 29. The counterclockwise turning of the second actuating lever 212 is limited by the armature 205 attracted to the head 201b.

Figure 30:
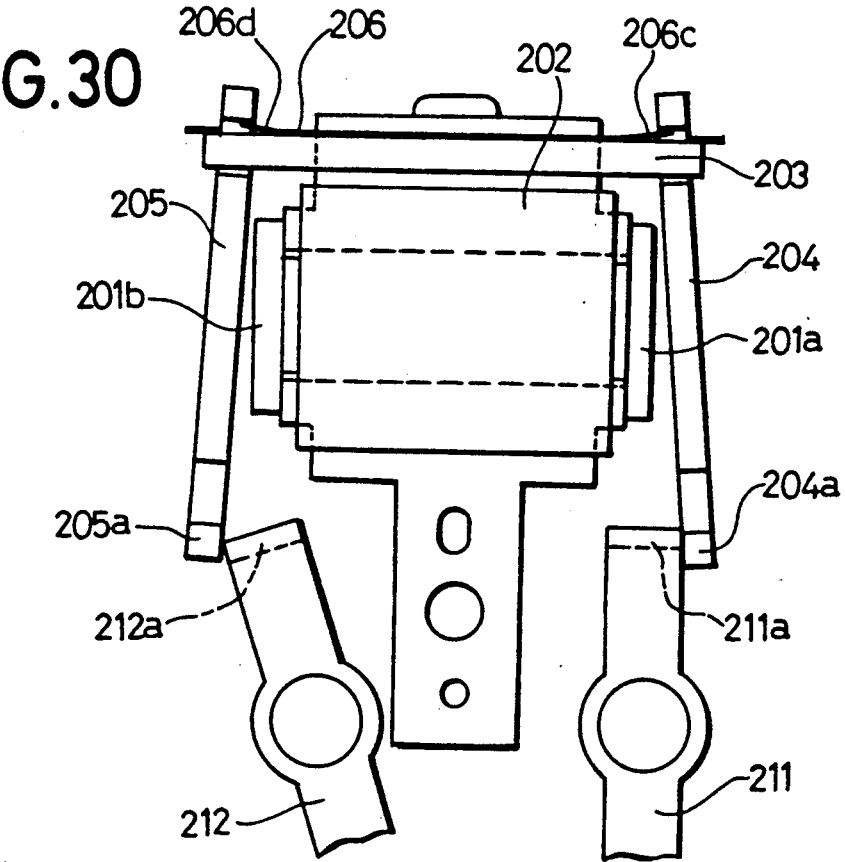

When the coil 202 is de-energized, the armature 205 is allowed to separate from the head 201b as shown in FIG. 30. Then, the second actuating lever 212 is turned further counterclockwise and the first actuating lever 211 is turned clockwise by the force applied thereto by the shutter-diaphragm control system. Then, the stopping mechanism of a device, not shown, is operated to hold the second actuating lever 212 at a position where the second actuating lever 212 is separated from the armature 205, and thereby the initial state as shown in FIG. 27 is restored.

When both the armatures 204 and 205 are attracted respectively to the head 201a and 201b as shown in FIG. 28, the magnetic path is closed, and thereby the magnetic flux density of the magnetic path increases to a saturated magnetic flux density. In such a state, the magnetic flux density is excessively large and hence the continuous supply of the same current causes useless power consumption. Therefore, upon the detection of attraction of the armatures 204 to the head 201a by a switch, not shown, interlocked with the first actuating lever 211 or through the detection of a reverse current induced in the coil 202, the current supplied to the coil 202 is decreased.

Figure 31:
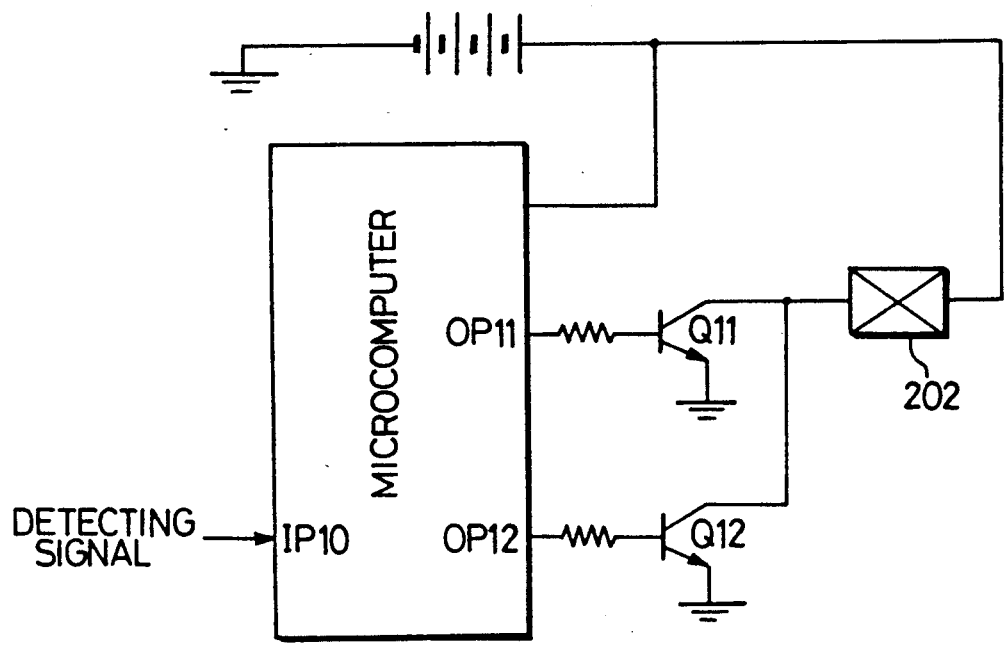
FIG. 31 is a circuit diagram of a control circuit for controlling the electromagnetic actuator of FIG. 24.

FIG. 31 shows a control circuit for controlling the current supplied to the coil 202. The control circuit comprises a microcomputer and two transistors Q11 and Q12 connected respectively to the output terminals OP11 and OP12 of the microcomputer. Upon the reception of a detection signal generated by detecting means for detecting the attraction of the first armature 204 to the head 201a, the microcomputer turns off one of the transistors Q11 and Q12 to decrease the current supplied to the coil 202.

Although the electromagnetic actuator has the two armatures 204 and 205, the electromagnetic actuator of the present invention is able to generate the same attraction as that of the conventional electromagnetic actuator having a single armature, because the coil 202 is energized with the armature 205 among the two armatures 204 and 205 in contact with the head 201b of the core 201 and hence the gap which increases the magnetic resistance of the magnetic path is not twice the gap of the conventional electromagnetic actuator even though the electromagnetic actuator of the present invention is provided with the two armatures.

As is apparent from the foregoing description, the electromagnetic actuator in accordance with the present invention has two armatures for actuating two operating members in combination with a single coil, and is capable of operating the two operating members by energizing or de-energizing the single coil. Accordingly, an apparatus having a plurality of operating members actuated by electromagnetic actuators of the present invention requires less number of electromagnetic actuators than an equivalent apparatus employing the conventional electromagnetic actuators.

What is claimed is:

1. An electromagnetic actuator, comprising:
   a core formed of a magnetic material;
   a coil wound around said core;
   a yoke formed of a magnetic material and extended substantially in parallel to an axis of said core;
   a first armature formed of a magnetic material and supported at one end thereof on one end of said yoke so as to be located opposite to one end of said core;
   a second armature formed of a magnetic material and supported at one end thereof on the other end of said yoke so as to be located opposite to the other end of said core;
   a first operating member which is actuated by said first armature;
   a second operating member which is actuated by said second armature; and
   a positioning and holding device which positions and holds one of said armatures on a corresponding end of said core before the other armature is attracted to the other corresponding end of said core.

2. An electromagnetic actuator according to claim 1, wherein each of said first and second armatures is movable between a position on a corresponding end of said core and a position separated from the corresponding end of said core.

3. An electromagnetic actuator, comprising:
   a core formed of a magnetic material;
   a coil wound around said core;
   a yoke formed of a magnetic material and extended substantially in parallel to an axis of said core; and
   a pair of armatures supported respectively on opposite ends of said yoke opposite to corresponding ends of said core, said armatures being supported swingably between positions attracted to said core, wherein a closed magnetic path is formed in combination with said core and said yoke, and positions separated from said core,
   wherein each of the opposite ends of said core which faces one of said armatures is formed with a convex surface, such that each armature is brought into contact, when attracted, with a corresponding end of said core at a position which is a greater distance from said yoke than a distance between said yoke and a center axis of said core.

4. An electromagnetic actuator according to claim 3, wherein said convex surface is a portion of a spherical surface.

5. An electromagnetic actuator according to claim 3, wherein said convex surface is a portion of a conical surface.

* * * * *